(12) United States Patent
Blackman

(10) Patent No.: US 10,395,439 B2
(45) Date of Patent: Aug. 27, 2019

(54) METHODS AND APPARATUS FOR ASSISTING IN THE MAINTENANCE OF AIRCRAFT AND OTHER MOBILE PLATFORMS USING OCCURRENCE PROBABILITIES OF POTENTIAL CAUSES OF A DETECTED EVENT

(71) Applicant: BOMBARDIER INC., Dorval (CA)

(72) Inventor: Michael Blackman, Dollard des Ormeaux (CA)

(73) Assignee: BOMBARDIER INC., Dorval (CA)

( * ) Notice: Subject to any disclaimer, the term of this patent is extended or adjusted under 35 U.S.C. 154(b) by 193 days.

(21) Appl. No.: 15/319,123

(22) PCT Filed: Jun. 23, 2015

(86) PCT No.: PCT/IB2015/054693
§ 371 (c)(1),
(2) Date: Dec. 15, 2016

(87) PCT Pub. No.: WO2015/198216
PCT Pub. Date: Dec. 30, 2015

(65) Prior Publication Data
US 2017/0132851 A1 May 11, 2017

Related U.S. Application Data

(60) Provisional application No. 62/017,519, filed on Jun. 26, 2014.

(51) Int. Cl.
*G07C 5/00* (2006.01)
*G07C 5/08* (2006.01)
*G05B 23/02* (2006.01)

(52) U.S. Cl.
CPC ......... *G07C 5/008* (2013.01); *G05B 23/0245* (2013.01); *G05B 23/0275* (2013.01); *G07C 5/0808* (2013.01)

(58) Field of Classification Search
None
See application file for complete search history.

(56) References Cited

U.S. PATENT DOCUMENTS 7,149,612 B2 * 12/2006 Stefani ................... G01D 9/005
701/31.9
7,509,537 B1 * 3/2009 Jensen ............... G05B 23/0229
714/47.2

(Continued)

FOREIGN PATENT DOCUMENTS

| CN | 102799171 A | 11/2012 |
| CN | 103149893 A | 6/2013 |

(Continued)

OTHER PUBLICATIONS

PCT international Search Report and Written Opinion dated Aug. 24, 2015 re: International Application No. PCT/IB2015/054693.

(Continued)

*Primary Examiner* — Jonathan M Dager
*Assistant Examiner* — Garrett F Evans
(74) *Attorney, Agent, or Firm* — Norton Rose Fulbright Canada LLP

(57) ABSTRACT

The present disclosure relates to health monitoring and maintenance of mobile platforms such as aircraft. In particular, onboard apparatus and methods and also ground-based apparatus and methods that cooperate in assisting with the maintenance of mobile platforms by facilitating diagnosis of events detected onboard mobile platforms while such mobile platforms are in operation (e.g., transit, flight) are disclosed. In various aspects, the present disclosure discloses apparatus and methods for handling and reporting the detection of events onboard mobile platforms, reporting predefined additional information associated with the event upon request from a ground facility, identifying one or more (Continued)

potential causes for the detected event and determining the occurrence probability for each potential cause identified.

32 Claims, 17 Drawing Sheets

(56) References Cited

U.S. PATENT DOCUMENTS

| | | | |
|---|---|---|---|
| 8,335,601 | B2 | 12/2012 | Sham et al. |
| 8,442,702 | B2 | 5/2013 | Geiter |
| 8,452,475 | B1 | 5/2013 | West et al. |
| 8,510,083 | B2 | 8/2013 | Kipersztok et al. |
| 2003/0208309 | A1* | 11/2003 | Triphathi ............... G07C 5/008 701/33.4 |
| 2010/0083056 | A1* | 4/2010 | Spier .................. G05B 23/0275 714/47.3 |
| 2011/0046842 | A1 | 2/2011 | Smith |
| 2012/0303205 | A1 | 11/2012 | Subramania et al. |
| 2013/0079972 | A1 | 3/2013 | Lake et al. |
| 2013/0159240 | A1 | 6/2013 | Singh et al. |
| 2013/0317694 | A1* | 11/2013 | Merg .................... G07C 5/008 701/31.6 |

FOREIGN PATENT DOCUMENTS

| | | | |
|---|---|---|---|
| CN | 103163877 | A | 6/2013 |
| CN | 203298799 | U | 11/2013 |

OTHER PUBLICATIONS

English translation of Chinese patent document No. 203298799U dated Nov. 20, 2013; www33.orbit.com.
The State Intellectual Property Office of the People's Replublic of China, Office Action dated Aug. 21, 2018 re: application No. 201580032196.5.
English translation of China patent document No. CN 103163877 dated Jun. 19, 2013, https://www38.orbit.com/?locale=en&ticket=4f154ce0-988b-4f90-b8bd-29cb3883d65a&embedded=false#PatentDocumentPage, accessed on Oct. 15, 2018.
English translation of China patent document No. CN 103149893 dated Jun. 12, 2013, https://www38.orbit.com/?locale=en&ticket=4f154ce0-988b-4f90-b8bd-29cb3883d65a&embedded=false#PatentDocumentPage, accessed on Oct. 15, 2018.
English translation of China patent document No. CN 102799171 dated Nov. 28, 2012, https://www38.orbit.com/?locale=en&ticket=41154ce0-988b-4f90-b8bd-29cb3883d65a&embedded=false#PatentDocumentPage, accessed on Oct. 15, 2018.

* cited by examiner

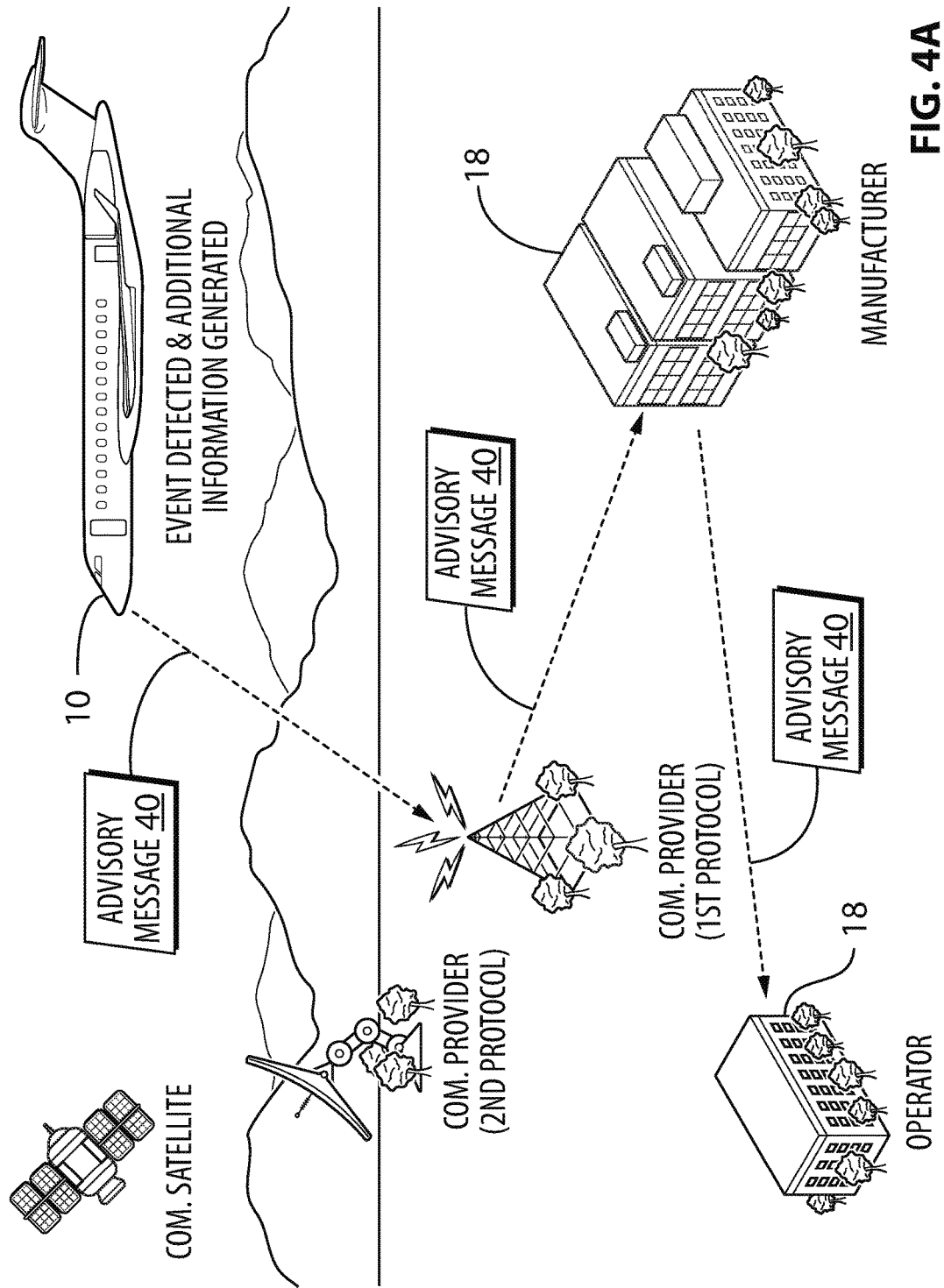

| PARAMETER (CURRENT DATA) | ADDITIONAL INFORMATION | | |
|---|---|---|---|
| | VALUE | DATA/TIME | ENVIRONMENTAL DATA |
| HYD_SYS_3_PRESS | -- | -- | AMBIENT TEMPERATURE:-- |
| HYD_ACMP_3A_HI_PRESS | -- | -- | OAT:-- |
| HYD_ACMP_3A_LO_PRESS | -- | -- | ALTITUDE:-- |
| HYD_ACMP_3B_HI_PRESS | -- | -- | AIRSPEED:-- |
| HYD_ACMP_3B_LO_PRESS | -- | -- | PITCH RATE:-- |
| HYD_SYS_3_QTY | -- | -- | ROLL RATE:-- |
| HYD_SYS_3_TEMP | -- | -- | YAW RATE:-- |
| HYD_ACMP_3B_TEMP | -- | -- | HEADING:-- |
| HYD_3_LO_PRESS_CAS | -- | -- | UTC:-- |
| HYD_PUMP_3B_FAIL_CAS | -- | -- | |
| HYD_ACMP_3B_COMMAND_ON | -- | -- | |
| AC_BUSBAR_AVAIL | -- | -- | |
| HYD_ACMP_3B_VOLTAGE_PHA | -- | -- | |
| HYD_ACMP_3B_VOLTAGE_PHB | -- | -- | |
| HYD_ACMP_3B_VOLTAGE_PHC | -- | -- | |
| HYD_ACMP_3B_CURRENT_PHA | -- | -- | |
| HYD_ACMP_3B_CURRENT_PHB | -- | -- | |
| HYD_ACMP_3B_CURRENT_PHC | -- | -- | |
| HYD_ACMP_3B_RCCB-STATUS | -- | -- | |

FIG. 11

HISTORICAL DATA

| EVENT | DATE / TIME | SYSTEM | CAUSE | CURRENT/ ENVIRONMENT DATA |
|---|---|---|---|---|
| HYD_PUMP_3B_FAIL | -- | HYDRAULIC | K16 RELAY CONTACT FAILS OPEN | -- |
| HYD_PUMP_3B_FAIL | -- | HYDRAULIC | PUMP FAILS | -- |
| HYD_PUMP_3B_FAIL | -- | ELECTRICAL | HYD_ACMP_3B RCCB FAILS OPEN | -- |
| HYD_PUMP_3B_FAIL | -- | HYDRAULIC | K16 RELAY CONTACT FAILS OPEN | -- |
| HYD_PUMP_3B_FAIL | -- | HYDRAULIC | K16 RELAY COIL FAILS OPEN | -- |
| HYD_PUMP_3B_FAIL | -- | HYDRAULIC | K16 RELAY CONTACT FAILS OPEN | -- |
| HYD_PUMP_3B_FAIL | -- | AIR DATA SYSTEM | ADC1 AND ADC2 AIRSPEED MISMATCH | -- |
| HYD_PUMP_3B_FAIL | -- | HYDRAULIC | K16 RELAY CONTACT FAILS OPEN | -- |
| HYD_PUMP_3B_FAIL | -- | HYDRAULIC | K16 RELAY CONTACT FAILS OPEN | -- |

FIG. 12

FLEET DATA

| EVENT | DATE | SYSTEM | CAUSE | A/C TAIL NUMBER | CURRENT/ ENVIRONMENT DATA |
|---|---|---|---|---|---|
| HYD_PUMP_3B_FAIL | -- | HYDRAULIC | K16 RELAY CONTACT FAILS OPEN | Nxxx1 | -- |
| HYD_PUMP_3B_FAIL | -- | HYDRAULIC | PUMP FAILS | Nxxx1 | -- |
| HYD_PUMP_3B_FAIL | -- | ELECTRICAL | HYD_ACMP_3B RCCB FAILS OPEN | Nxxx1 | -- |
| HYD_PUMP_3B_FAIL | -- | HYDRAULIC | K16 RELAY CONTACT FAILS OPEN | Nxxx1 | -- |
| HYD_PUMP_3B_FAIL | -- | HYDRAULIC | K16 RELAY COIL FAILS OPEN | Nxxx1 | -- |
| HYD_PUMP_3B_FAIL | -- | HYDRAULIC | K16 RELAY CONTACT FAILS OPEN | Nxxx1 | -- |
| HYD_PUMP_3B_FAIL | -- | AIR DATA SYSTEM | ADC1 AND ADC2 AIRSPEED MISMATCH | Nxxx1 | -- |
| HYD_PUMP_3B_FAIL | -- | HYDRAULIC | K16 RELAY CONTACT FAILS OPEN | Nxxx2 | -- |
| HYD_PUMP_3B_FAIL | -- | HYDRAULIC | K16 RELAY CONTACT FAILS OPEN | Nxxx6 | -- |
| HYD_PUMP_3B_FAIL | -- | HYDRAULIC | K16 RELAY CONTACT FAILS OPEN | Nxxx4 | -- |
| HYD_PUMP_3B_FAIL | -- | HYDRAULIC | K16 RELAY CONTACT FAILS OPEN | Nxxx7 | -- |
| HYD_PUMP_3B_FAIL | -- | HYDRAULIC | K16 RELAY CONTACT FAILS OPEN | Nxxx2 | -- |
| HYD_PUMP_3B_FAIL | -- | HYDRAULIC | K16 RELAY CONTACT FAILS OPEN | Nxxx5 | -- |
| HYD_PUMP_3B_FAIL | -- | HYDRAULIC | K16 RELAY CONTACT FAILS OPEN | Nxxx6 | -- |
| HYD_PUMP_3B_FAIL | -- | HYDRAULIC | K16 RELAY CONTACT FAILS OPEN | Nxxx8 | -- |
| HYD_PUMP_3B_FAIL | -- | HYDRAULIC | K16 RELAY CONTACT FAILS OPEN | Nxxx3 | -- |
| HYD_PUMP_3B_FAIL | -- | HYDRAULIC | K16 RELAY CONTACT FAILS OPEN | Nxxx1 | -- |
| HYD_PUMP_3B_FAIL | -- | HYDRAULIC | K16 RELAY CONTACT FAILS OPEN | Nxxx2 | -- |

FIG. 13

METHODS AND APPARATUS FOR ASSISTING IN THE MAINTENANCE OF AIRCRAFT AND OTHER MOBILE PLATFORMS USING OCCURRENCE PROBABILITIES OF POTENTIAL CAUSES OF A DETECTED EVENT

CROSS-REFERENCE TO RELATED APPLICATION

This application is a national phase application under 35 U.S.C. 371 of International Patent Application No. PCT/IB2015/054693 filed on Jun. 23, 2015, which claims priority from U.S. Provisional Patent Application Ser. No. 62/017,519, filed on Jun. 26, 2014, the entire content of which is incorporated herein by reference.

TECHNICAL FIELD

The disclosure relates generally to maintenance of mobile platforms, and more particularly to the methods and apparatus to assist with the health monitoring and maintenance of aircraft and other mobile platforms.

BACKGROUND OF THE ART

Some aircraft have onboard monitoring systems that can monitor the health of some systems of such aircraft and that are able to detect conditions that are indicative of non-normal operation (i.e., faults) associated with such systems based on sensed parameters. When a fault is detected by the monitoring system, a concise message may be transmitted from the aircraft to inform an operator or maintenance provider for the aircraft that the fault has been detected. Based on such message, maintenance personnel may be alerted of the detected condition and prepare to troubleshoot the problem once the aircraft has landed and, if necessary, make necessary repairs. Depending on the particular fault detected, troubleshooting the problem can be labour-intensive, time-consuming and hence costly. Furthermore, the airplane must typically remain out of service at the maintenance facility to be available to maintenance personnel while such troubleshooting and repair is performed.

Improvement is therefore desirable.

SUMMARY

In one aspect, the disclosure describes a computer-implemented method for assisting in the maintenance of a mobile platform by determining occurrence probabilities of one or more potential causes of an event detected onboard the mobile platform where the method is performed by a data processor remote from the mobile platform. The method comprises:
receiving, from the mobile platform, an identification of the event associated with a system of the mobile platform;
using the identification of the event and predefined diagnostic rules associated with the event, identifying the one or more potential causes of the event;
using other data related to the event, computing an occurrence probability for each potential cause for the event; and
generating an output, the output comprising an identification of each potential cause and its associated occurrence probability.

In some embodiments, the other data comprises current data received from the mobile platform. The current data may include a sensed parameter and/or a derived parameter associated with the system.

In some embodiments, generating the output occurs while the mobile platform is in flight.

In some embodiments, the other data comprises historical data. The historical data may relate to a previous occurrence of the same event on the same mobile platform. The historical data may relate to a previous occurrence of another event on the same mobile platform.

In some embodiments, the other data comprises fleet data. The fleet data may relate to a previous occurrence of the same event on another mobile platform. The fleet data may relates to a previous occurrence of another event on another mobile platform.

In some embodiments, the other data comprises environmental data. The environmental data may comprise any one of weather data, flight environment data and mobile platform performance data.

In some embodiments, generating the output comprises displaying an identification of each cause with a corresponding indication of its associated probability on a graphical user interface.

In some embodiments, the occurrence probability includes a percentage.

In some embodiments, the occurrence probability includes an indication of relative likelihood of occurrence of each potential cause.

In some embodiments, the output comprises an indication of the type(s) of other data used to compute the occurrence probability of each potential cause.

In another aspect, the disclosure describes a ground-based apparatus for assisting with maintenance of a mobile platform. The apparatus comprises:
a communication terminal for receiving data from the mobile platform;
a display device;
a data processor coupled to the communication terminal and to the display device; and
a non-transitory computer-readable medium containing instructions readable and executable by the data processor to perform a method comprising:
using data including identification of the event received from the mobile platform and predefined diagnostic rules stored in the computer-readable medium, identifying one or more potential causes of the event;
using other data related to the event, computing an occurrence probability for each potential cause for the event; and
generating an output for the display device, the output comprising an identification of each potential cause and its associated occurrence probability.

In some embodiments, the other data comprises current data from the mobile platform. The current data may include a sensed parameter and/or a derived parameter associated with the system.

In some embodiments, the other data comprises historical data. The historical data may relate to a previous occurrence of the same event on the same mobile platform. The historical data may relate to a previous occurrence of another event on the same mobile platform.

In some embodiments, the other data comprises fleet data. The fleet data may relate to a previous occurrence of the same event on another mobile platform. The fleet data may relate to a previous occurrence of another event on another mobile platform.

In some embodiments, the other data comprises environmental data. The environmental data may comprise any one of weather data, flight environment data and mobile platform performance data.

In some embodiments, generating the output comprises causing the display device to display an identification of each cause with a corresponding indication of its associated probability.

In some embodiments, the occurrence probability includes a percentage.

In some embodiments, the occurrence probability includes a relative indication of likelihood of each potential cause.

In some embodiments, the output comprises an indication of the type(s) of other data used to compute the probability of occurrence of each potential cause.

In another aspect, the disclosure describes a computer program product comprising a non-transitory computer readable storage medium having program code embodied therewith, the program code readable/executable by a computer, processor or logic circuit to perform any one of the methods disclosed herein.

In a further aspect, the disclosure describes a computer program product for assisting with maintenance of a mobile platform with a ground-based apparatus, the computer program product comprising a non-transitory computer readable storage medium having program code embodied therewith where the program code is readable/executable by a computer, processor or logic circuit to perform a method comprising:

using data including an identification of the event received from the mobile platform and predefined diagnostic rules stored in the computer-readable medium, identifying one or more potential causes of the event;

using other data related to the event, computing an occurrence probability for each potential cause for the event; and generating an output for a display device, the output comprising an identification of each potential cause and its associated occurrence probability.

In some embodiments, the other data comprises one or more of current data, historical data, environmental data and fleet data.

In some embodiments, the output comprises an indication of the type(s) of other data used to compute the probability of occurrence of each potential cause.

Further details of these and other aspects of the subject matter of this application will be apparent from the detailed description and drawings included below.

DESCRIPTION OF THE DRAWINGS

Reference is now made to the accompanying drawings, in which:

FIGS. 4A and 4B show schematic representations of an exemplary embodiment of the method of FIG. 3;

FIG. 11 is a table illustrating exemplary additional information generated and stored on the aircraft of FIG. 1;

FIG. 12 is a table illustrating exemplary historical data;

FIG. 13 is a table illustrating exemplary fleet data; and

DETAILED DESCRIPTION

Aspects of various embodiments are described through reference to the drawings.

The present disclosure relates to health monitoring and maintenance of mobile platforms. In various aspects, the present disclosure relates to assisting with the maintenance of mobile platforms, handling the detection of events onboard mobile platforms, identifying one or more potential causes for detected events and determining the occurrence probability for each potential cause. Accordingly, the present disclosure discloses onboard apparatus and methods and also ground-based apparatus and methods that may cooperate in assisting with the maintenance of mobile platforms by facilitating diagnosis of events detected onboard mobile platforms while such mobile platforms are in operation (e.g., transit, flight) and thereby permit the planning of required maintenance (e.g., obtaining replacement parts, alerting maintenance personnel) even before the mobile platform has landed or has otherwise returned to a maintenance facility. In some embodiments, aspects of the present disclosure may contribute toward reduced maintenance time and costs and also reduce the time that a mobile platform may be required to be out of service in order to have troubleshooting or maintenance performed thereon. Even though the present disclosure mainly makes reference to aircraft, many aspects of the present disclosure could equally apply to other types of mobile platforms such as trains, busses, watercraft (e.g., ships), spacecraft, trucks, automobiles and other types of vehicles.

Figure 1:
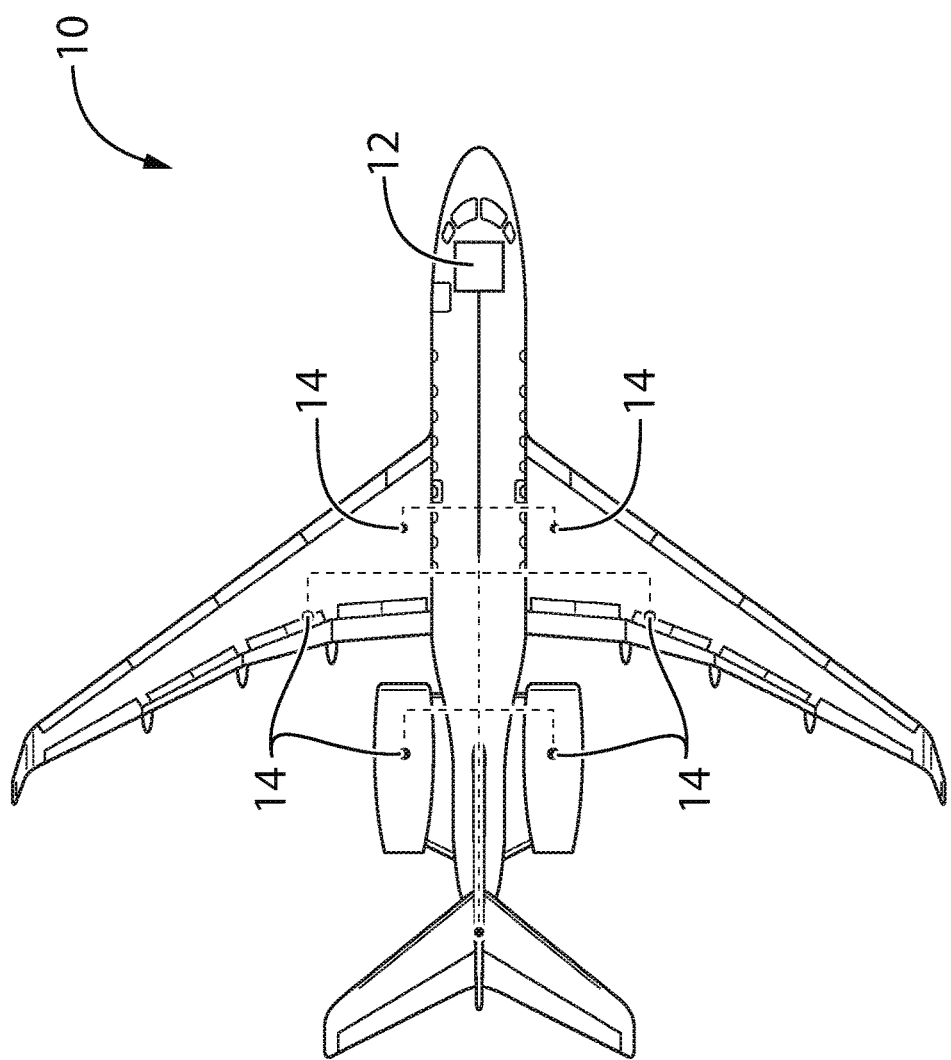
FIG. 1 is a top plan view of an exemplary aircraft comprising an exemplary onboard apparatus for assisting with maintenance of the aircraft.

FIG. 1 is a top plan view of an exemplary aircraft 10 with which various aspects of the present disclosure may be used. Aircraft 10 may include, for example, any suitable aircraft such as corporate, private, commercial or any other type of aircraft including fixed-wing and rotary-wing aircraft. Aircraft 10 may, for example, be a narrow-body, twin engine jet airliner. FIG. 1 also shows onboard apparatus 12 for assisting with maintenance of aircraft 10. Onboard apparatus 12 may also be used to detect events onboard aircraft 10. Onboard apparatus 12 may be coupled to one or more sensors 14 associated with (e.g., may be part of) one or more systems 16 (shown schematically in FIG. 2) of aircraft 10. Onboard apparatus 12 and sensors 14 are shown schematically in FIG. 1 and are shown as being superimposed over aircraft 10 for illustration purpose only. Onboard apparatus 12 may be coupled to sensors 14 via wired or wireless connections. The one or more systems 16 coupled to onboard apparatus 12 may be located in different areas of aircraft 10. Systems 16 may include any monitored system 16 of aircraft 10 and aspects of the present disclosure are not intended to be limited to the specific systems 16 disclosed herein. By way of non-limiting examples, such systems 16 may include fuel tanks and fuel delivery systems, landing gear, avionics equipment, flight control computers, engines, power generators, flight control surfaces, actuators, hydraulic pumps, water tanks, in-flight entertainment systems, pressurization systems, doors, lavatories, and various line replaceable units (LRUs).

Onboard apparatus 12 may be configured to detect one or more events associated with one or more of systems 16. The detection of such events may be based on logic rules (e.g., thresholds) stored in memory 26 for sensed parameters associated with the one or more systems 16. Accordingly, onboard apparatus 12 may be configured to monitor one or more systems 16 of aircraft 10 and detect such events. An event may, for example, include an indication of degraded performance, a non-normal operating condition, a fault (i.e. failure) condition, a precursor to a fault condition or any other condition that may require attention, further investigation, maintenance or other action.

Figure 2:
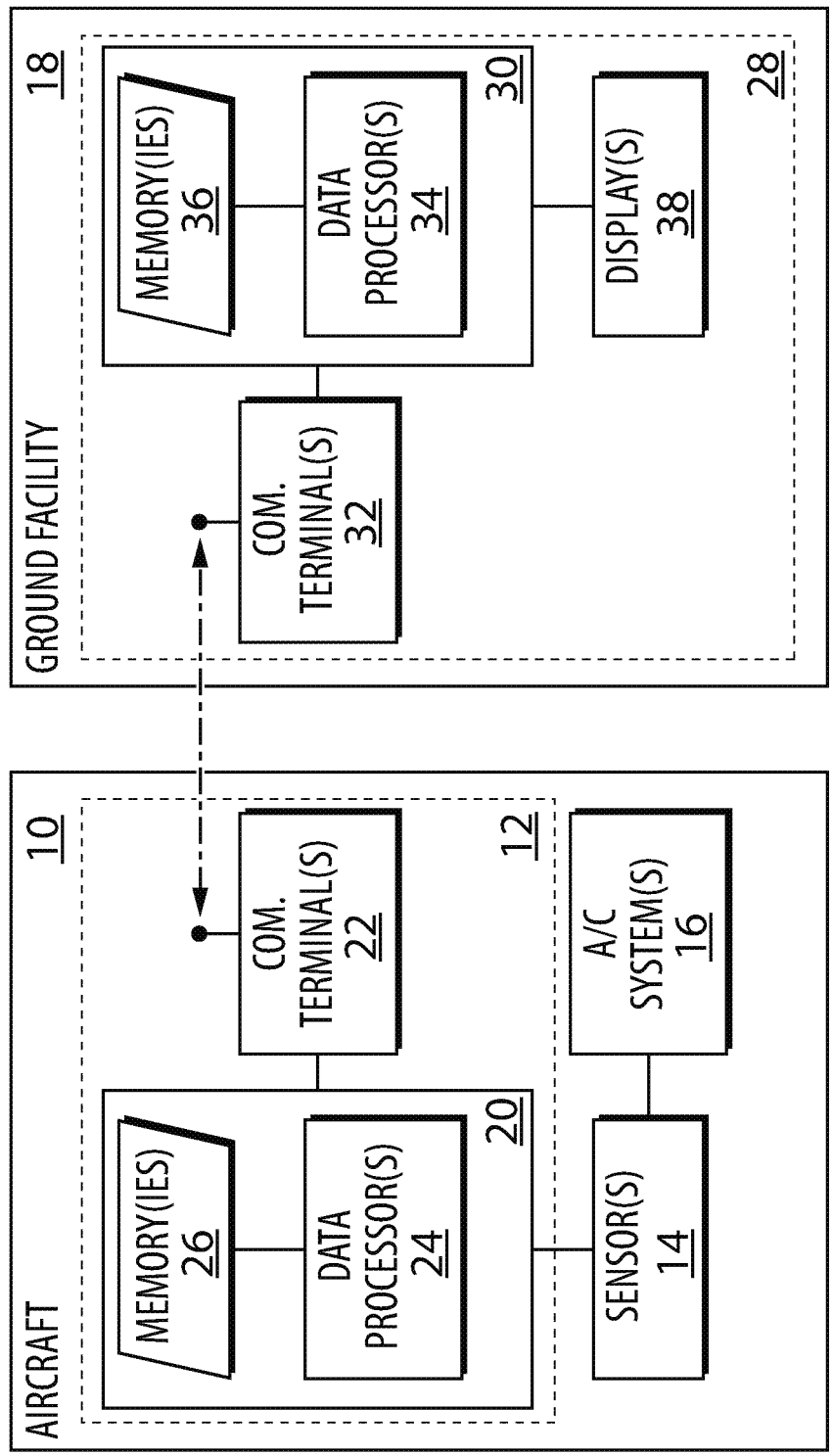
FIG. 2 shows a schematic representation of the aircraft of FIG. 1 and a schematic representation of an exemplary ground facility.

FIG. 2 shows a schematic representation of aircraft 10 and also a schematic representation of ground facility 18. Onboard apparatus 12 of aircraft 10 may comprise one or more health monitoring units 20 (referred hereinafter as "HMU 20") and one or more communication terminals 22 (referred hereinafter as "terminal 22") for receiving messages (i.e., signals) and for transmitting messages (i.e., signals) from aircraft 10. HMU 20 may be coupled to terminal 22 and also coupled to one or more monitored systems 16 of aircraft 10. HMU 20 may comprise one or more data processors 24 (referred hereinafter as "processor 24") and computer-readable memory(ies)/medium(ia) (referred hereinafter as "memory 26") containing instructions readable and executable by processor 24. HMU 20 may handle the monitoring, recording and offloading of data related to aircraft 10.

Ground facility 18 may comprise a single facility or a combination of two or more facilities. For example, ground facility 18 may include the facility of one or more of: a manufacturer of aircraft 10, a manufacturer of one or more systems 16 (e.g., engine) of aircraft 10, an operator of aircraft 10, a maintenance provider for any part of aircraft 10, a data service provider and/or any other authorised party involved in the health monitoring, operation and/or maintenance of aircraft 10. Ground facility 18 may comprise a combination of two or more facilities that may be located remotely from each other and between which data transfer may be conducted via known or other means. Ground facility 18 may comprise ground-based apparatus 28 which may also assist with maintenance of aircraft 10. Ground-based apparatus 28 may comprise one or more computers 30 (referred hereinafter as "computer 30"), which may be coupled to one or more communication terminals 32 (referred hereinafter as "terminal 32"). Terminal 32 may be configured to receive messages (i.e., signals) and for transmitting messages (i.e., signals) to aircraft 10.

Ground-based apparatus 28 may comprise one or more data processors 34 (referred hereinafter as "processor 34") and one or more computer-readable memory(ies)/medium (ia) 36 (referred hereinafter as "memory 36") containing instructions readable and executable by processor 34. Ground-based apparatus 28 may also comprise one or more display devices 38 (referred hereinafter as "display 38") coupled to computer 30 to permit communication of information to a user of ground-based apparatus 28 via suitable graphic user interface (GUI) explained further below. While display 38 may be used to visually communicate information to a user, other forms of output signal(s) (e.g., auditory) may be used instead of or in addition to display 38. Display 38 may, for example, include one or more cathode-ray tubes (CRTs), liquid crystal displays (LCDs), plasma displays, light-emitting diode (LED) based displays or any known or other suitable type of display device. Display 38 may be part of a portable electronic device such as a smart phone, tablet computer and/or laptop computer which may be in communication with computer 30 (e.g., via an internet/web-based application) or may comprise computer 30.

Display 38 may also provide means for ground-based apparatus 28 to receive input from a user. For example, display 38 may provide a touch-sensitive surface and a corresponding GUI that permits user input. Other user input means such as a keyboard, mouse or voice-based input means may be provided.

Processors 24 and 34 may, for example, comprise or be part of one or more digital computer(s) or other data processors or other suitably programmed or programmable logic circuits. Processors 24 and 34 may comprise general purpose computer(s), special purpose computer(s), or other programmable data processing apparatus. Processor 24 may be configured for use onboard aircraft 10.

Memories 26 and 36 may comprise any combination of one or more suitable computer readable medium(ia). The computer readable medium may be a non-transitory computer readable storage medium. Such non-transitory computer readable storage medium may comprise, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer-readable storage medium may be any tangible medium that can contain, or store instructions for use by or in connection with an instruction execution system, apparatus, or device such as processors 24 and 34.

Various aspects of the present disclosure may be embodied as systems, methods and/or computer program products. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) (e.g., memories 26 and/or 36) having computer readable program code (e.g., instructions) embodied thereon. The computer program product may, for example, be executable by data processors 24 and/or 34 or other suitable logic circuit to cause the execution of one or more of the methods disclosed in the present disclosure in entirety or in part.

Computer program code for carrying out operations for aspects of the present disclosure in accordance with instructions stored in memories 26 and or 36 may be written in any combination of one or more programming languages, including an object-oriented programming language such as Java, Smalltalk, C++ or the like and conventional procedural programming languages, such as the "C" programming language or other programming languages.

Terminals 22 and 32 may be configured to permit communication between aircraft 10 and ground-facility 18 via known or other communication methods and protocols. Accordingly, additional intermediate components (not shown) may be required to establish communication between terminals 22 and 32. In various embodiments, terminals 22 and 32 may be configured for communication using two or more selectable communication protocols so that different communication protocols may be used for different types of communications. For example, terminals 22 and 32 may be configured for communication via Aircraft Communications Addressing and Reporting (ACARS) communication protocol. ACARS communication may be conducted via satellite communication (SATCOM) or very high frequency (VHF) radio. Terminals 22 and 32 may also be configured for communication via a communication protocol from the Internet suite of protocols commonly known as TCP/IP (referred hereinafter as "Internet protocol"). An Internet protocol provides end-to-end connectivity specifying how data should be formatted, addressed, transmitted, routed and received at the destination. Communication between terminals 22 and 32 using an Internet protocol may be achieved via SATCOM, cellular communication or WiFi, for example.

Various tasks and methods performed by onboard apparatus 12 and ground-based apparatus 28 are described below. However, some tasks and methods said to be performed by ground-based apparatus 28 could be performed by onboard apparatus 12.

Figure 3:
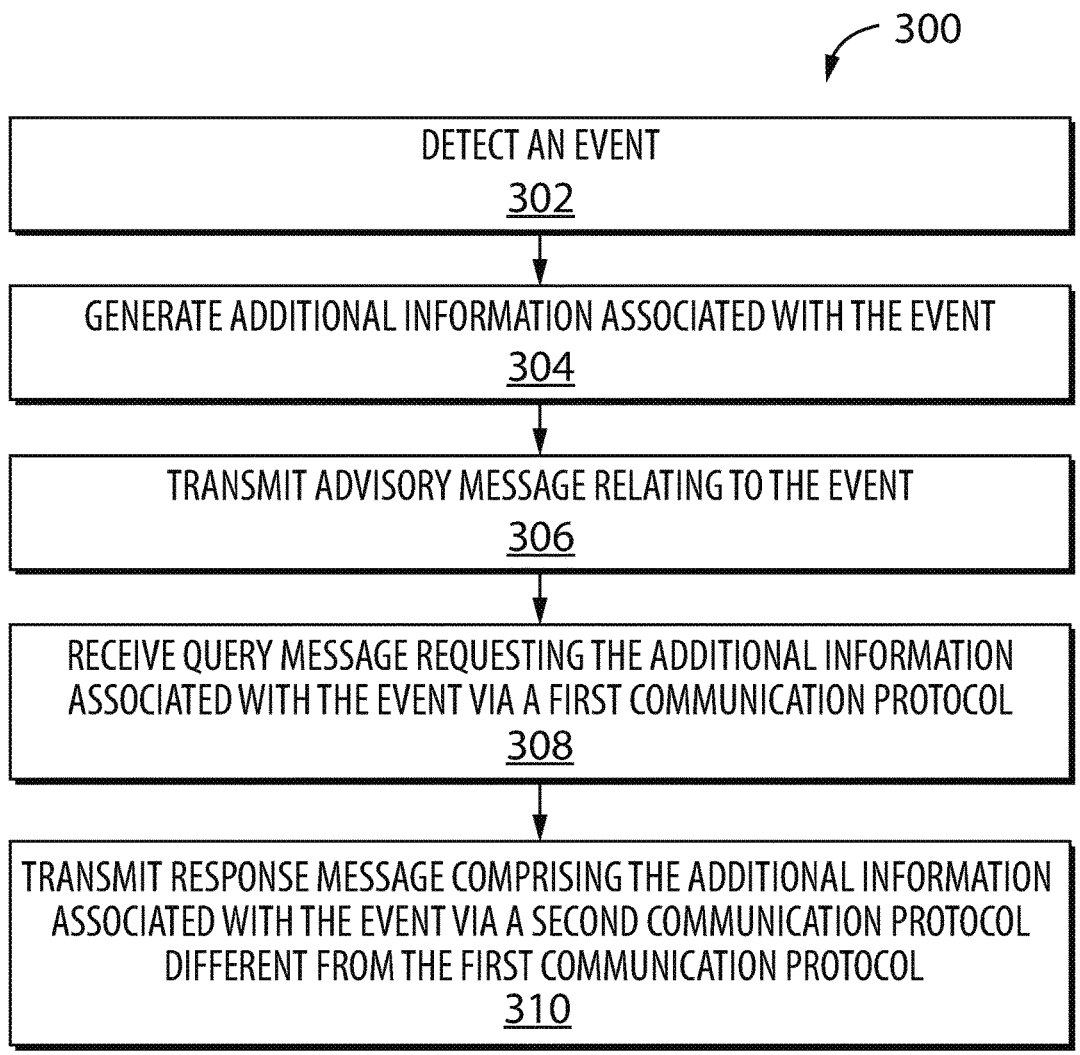
FIG. 3 is a flowchart of an exemplary method for assisting with maintenance of the aircraft of FIG. 1.
Figure 4B:
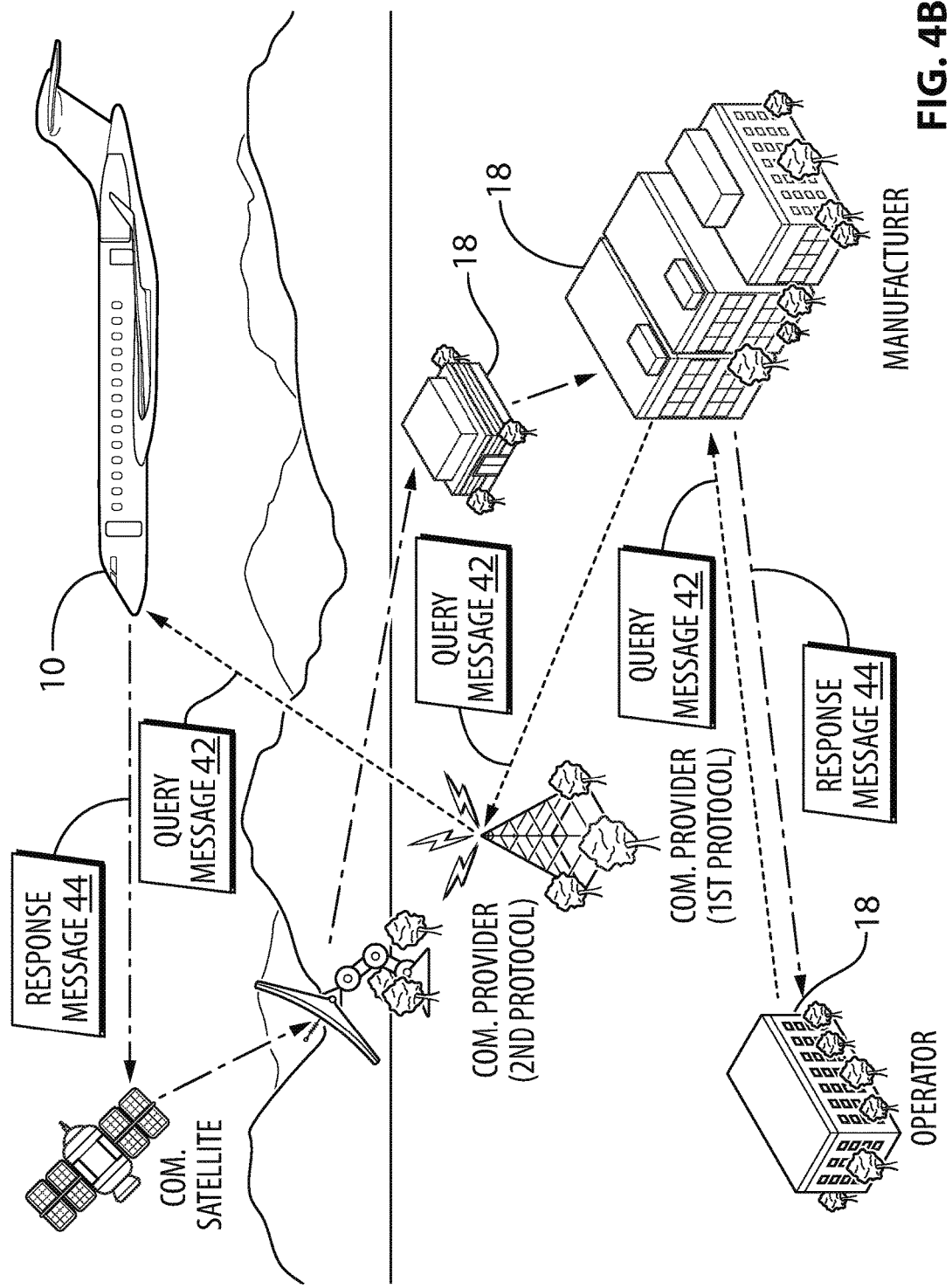

FIG. 3 is a flowchart of an exemplary method 300 for assisting with maintenance of aircraft 10. FIG. 4A and FIG. 4B together show schematic representations of an exemplary embodiment of method 300. Method 300 or part(s) thereof may be computer-implemented and may be performed using onboard apparatus 12 based on instructions stored in memory 26. In various embodiments, method 300 may comprise detecting an event (see block 302) on aircraft 10; generating additional information associated with the event (see block 304) and storing the additional information in memory 26 onboard aircraft 10; transmitting, from aircraft 10, advisory message 40 (see FIG. 4A) relating to the event (see block 306); receiving, at aircraft 10, query message 42 (see FIG. 4B) via a first communication protocol (see block 308) where the query message 42 requests the additional information associated with the event; and transmitting, from aircraft 10, response message 44 via a second communication protocol different from the first communication protocol (see block 310) where the response message 44 comprises the additional information associated with the event. Method 300 or parts thereof may be performed while aircraft 10 is in operation (e.g., in flight). Specifically, any one of the transmission of advisory message 40, the receipt of query message 44 and the transmission of response message 44 may be performed while aircraft 10 is in flight.

In some embodiments, the first communication protocol via which query message 42 may be received may be ACARS. Advisory message 40 may also be transmitted via ACARS. Communication via the first communication protocol and via the second communication protocol may be facilitated by the same or different communication service providers. The second communication protocol via which response message 44 may be transmitted may be an Internet protocol. In some embodiments, communication via the second communication protocol may be conducted via SATCOM.

In some embodiments, advisory message 40 may comprise identification of the event and also a link to the additional information. For example, an exemplary advisory message 40 transmitted via ACARS may be in the form shown below. The field "FDE" may contain a text string that identifies the event. The field "Parameter Report ID" may contain a text string (i.e., link) that references the additional information generated by HMU 20.

—BEGINNING OF SAMPLE ADVISORY MESSAGE 40—
FDE: HYD PUMP 3B FAIL (Advisory)
Time: 20Jun2014_17:03:12
FLIGHT_LEG: 06
FLIGHT_PHASE: Climb
Aircraft ID: XXXXX
Fault Message:ACMP 3B PRESS SWITCH FAIL (2931006PHSD)
Fault-Triggered parameter: YYYY
ATA 29
Time: 20Jun2014_17:03:12
Parameter Report ID: A/C ID_HYD PUMP 3B FAIL_20Jun2014_17:03:12
—END OF SAMPLE ADVISORY MESSAGE 40—

The link embedded in advisory message 40 may comprise an identifier that is associated with the additional information stored in memory 26 and can be used as a reference to the additional information. For example, the link received in advisory message 40 may be included (i.e., re-transmitted back to aircraft 10) in query message 42 so as to identify the additional information that is requested by ground facility 18. Then, the link received in query message 42 at onboard apparatus 12 may be used to retrieve the additional information and prepare and transmit response message 44. For example, the link may be used to generate query message 42 for the additional information that was captured when advisory message 40 was generated by aircraft 10. An exemplary query message 42 transmitted via ACARS may be in the form shown below. The field "Report ID" may contain the same text that references the additional information generated by HMU 20 that was included in advisory message 40. Query message 42 may include details of a data file that was captured and may include a parameter name, a duration and a rate of the recording.

—BEGINNING OF SAMPLE QUERY MESSAGE 42—
Request Report
Report ID: A/C ID_HYD PUMP 3B FAIL_20Jun2014_17:03:12
—END OF SAMPLE QUERY MESSAGE 42—

Since response message 44 may be larger in size than advisory message 40, it may be more appropriate to transmit such response message 44 using the Internet protocol instead of ACARS for economical or other reasons. In some situations, the selection of the appropriate communication protocol for the transmission of a message may be made based on the size or nature of the message, priority level, reliability, transmission speed, costs, security, availability and/or other factors. For example, in some situations it may not be practical to send large data streams via ACARS because this may be relatively expensive and slow.

The contents of additional information generated onboard aircraft 10 may be predefined based on the detected event. For example, when an event is detected by HMU 20, instructions stored in memory 26 may be configured to cause HMU 20 to collect and store values of certain sensed and/or derived parameters for certain periods of time. For example, the additional information may comprise one or more values of one or more sensed parameters relating to one or more systems 16 associated with the event before, during and/or after detection of the event. In some embodiments, the additional information may comprise one or more values of one or more derived parameters relating to one or more systems 16 associated with the event before, during and/or after detection of the event. The sensed parameters may be associated with the specific system 16 that caused the event or may be associated with one or more other systems that may interact with the specific system and therefore may have had a role to play in the occurrence of the event. The specific parameters sensed and the associated times for the sensed values relative to the time at which the event was detected may be predefined and associated with the event via instructions stored in memory 26. Accordingly, when an event is detected, HMU 20 may automatically proceed (e.g., without requiring external instructions, without user input) to generate the additional information according to the instructions stored in memory 26. The additional information generated may be in the form of a detailed report stored in digital form in memory 26 and referenced by way of the link that is transmitted in advisory message 40.

The additional information generated may be predefined based on the anticipated data that will be required to troubleshoot the event in order to determine one or more potential (e.g., root) causes of the event and assist maintenance personnel in planning for any required maintenance procedures to be performed on aircraft 10. Accordingly, the additional information may comprise relevant current data which may include and/or be derived based on data collected at the time the event occurred (e.g., for some time before and/or after the occurrence of the event) including potential triggers for the event and parameters that could have contributed to or caused the event. For example, in some embodiments, additional information could include data relating to one or more systems 16 of aircraft 10 other than the system 16 that is directly associated with the event, if applicable. The additional information may also include relevant environmental data which may include weather data, flight environment data and performance data associated with aircraft 10 at the time the event occurred, before the event occurred and/or after the event occurred. Depending on the event, additional information and hence the response message 44 into which the additional information is embedded may be substantially larger than the advisory message 40.

Figure 5:
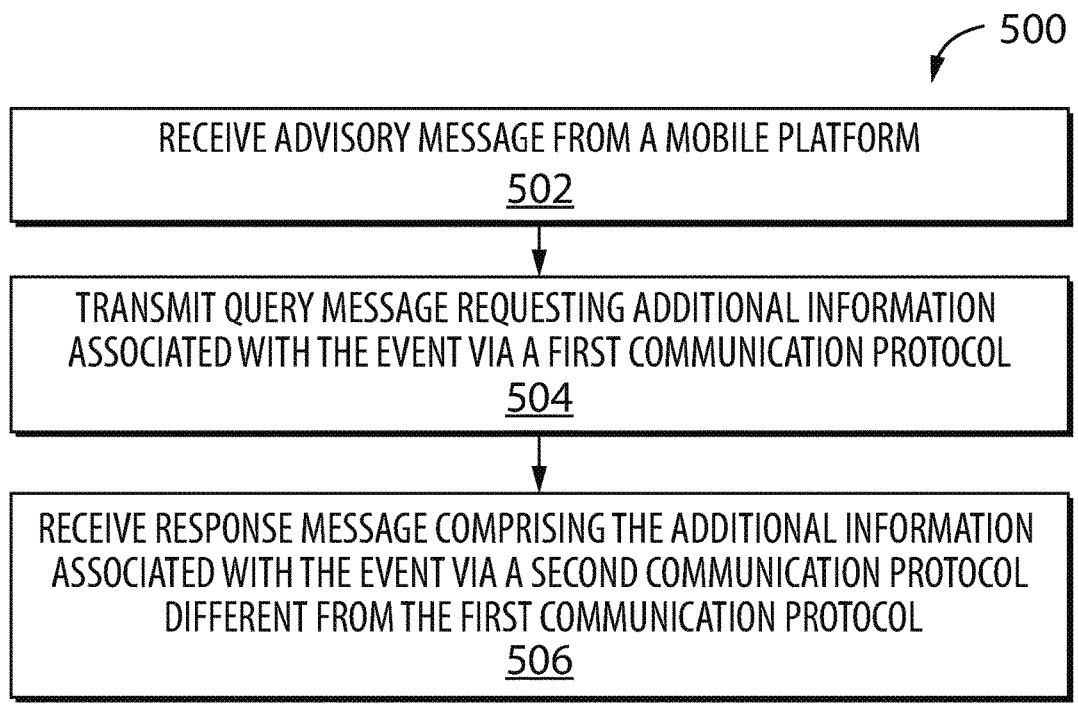
FIG. 5 is a flowchart of another exemplary method for assisting with maintenance of the aircraft of FIG. 1.

FIG. 5 is a flowchart of another exemplary method 500 for assisting with maintenance of aircraft 10. FIGS. 4A and 4B also show schematic representations of an exemplary embodiment of method 500. Method 500 or part(s) thereof may be computer-implemented and may be performed using ground-based apparatus 28 based on instructions stored in memory 36. Method 500 may be related to and performed in conjunction and in cooperation with other methods disclosed herein. Method 500 or part(s) thereof may be combined with part(s) of other methods disclosed herein. For example, while method 300 may be performed substantially by onboard apparatus 12, method 500 may be performed substantially by ground-based apparatus 28. Accordingly, elaborations and variations provided above in relation to method 300 may also apply to method 500 and will not be repeated.

In various embodiments, method 500 may comprise: receiving, at ground facility 18, advisory message 40 from a mobile platform (e.g., aircraft 10), the advisory message 40 comprising identification of an event detected onboard the mobile platform (see block 502); transmitting, from ground facility 18, query message 42 to the mobile platform via a first communication protocol (e.g., ACARS), the query message 42 requesting predefined additional information associated with the event and stored on the mobile platform (see block 504); and receiving, at ground facility 18, response message 44 from the mobile platform via a second communication protocol (e.g., Internet) different from the first communication protocol, the response message 44 comprising the additional information associated with the event (see block 506).

The transmission of query message 42 may be commanded by processor 34 and may be done upon receiving user input. For example, once advisory message 40 has been received at ground facility 18, a user and/or computer 30 may consider the event that has been detected and determine whether or not the additional information is required. Accordingly, in some embodiments, the user may select to request the predefined additional information that is stored on aircraft 10. Upon receipt of such user input, computer 30 may generate query message 42 including the link to the additional information from advisory message 40 and command terminal 32 to transmit query message 42 to aircraft 10. Computer 30 may instruct that query message 42 be transmitted via ACARS.

Figure 6:
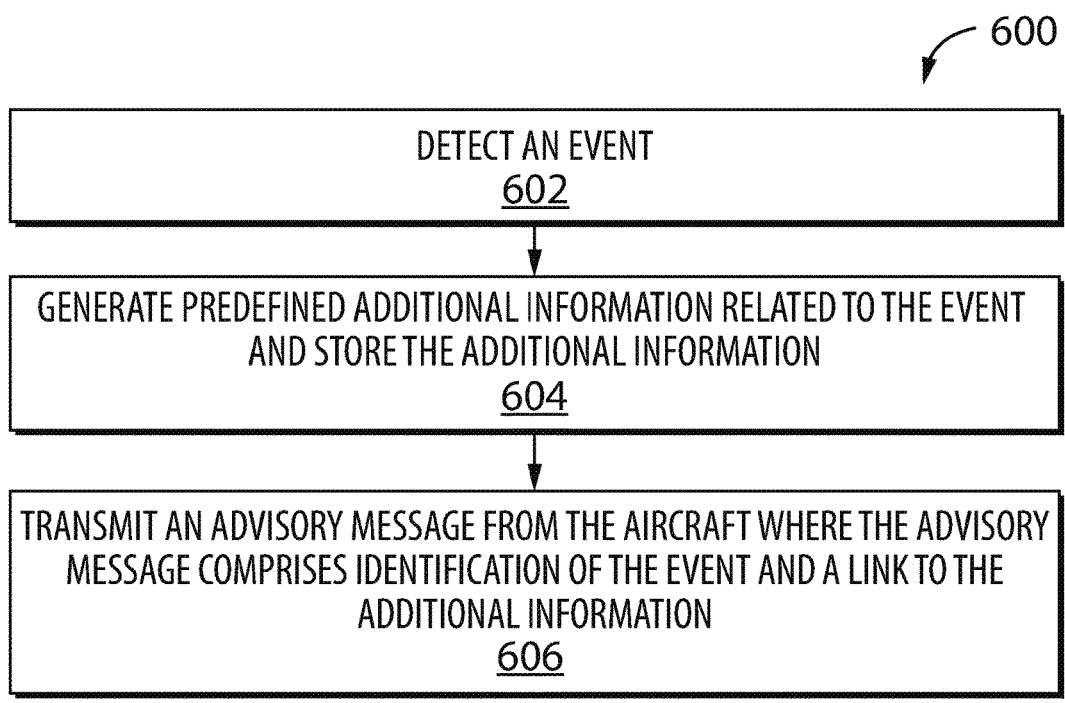
FIG. 6 is a flowchart of an exemplary method for handling the detection of an event onboard the aircraft of FIG. 1.

FIG. 6 is a flowchart of an exemplary method 600 for handling the detection of an event onboard aircraft 10. Method 600 or part(s) thereof may be computer-implemented and may be performed using onboard apparatus 12 based on instructions stored in memory 26. Method 600 may be related to and performed in conjunction and cooperation with other methods disclosed herein. Method 600 or part(s) thereof may be combined with part(s) of other methods disclosed herein. Accordingly, elaborations and variations provided above in relation to methods 300 and 500 may also apply to method 600 and will not be repeated.

In various embodiments, method 600 may comprise: detecting the event (see block 602); generating predefined additional information related to the event and storing the additional information in computer-readable medium 26 (see block 604); and transmitting advisory message 40 from aircraft 10 where advisory message 40 comprises identification of the event and also a link to the additional information (see block 606). Method 600 may also comprise, upon receipt of a query message referencing the link, commanding transmission of response message 44 comprising the additional information. The transmission of advisory message 40 and/or response message 44 may be commanded by HMU 20 and may be performed via terminal 22.

Figure 7:
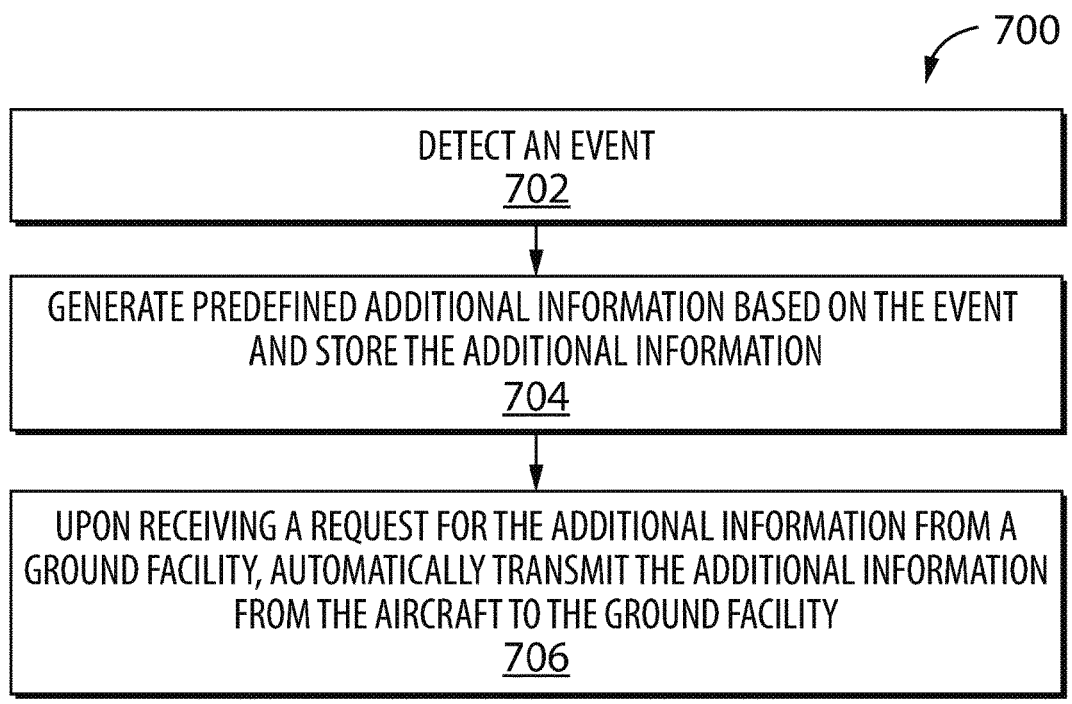
FIG. 7 is a flowchart of another exemplary method for handling the detection of an event onboard the aircraft of FIG. 1.

FIG. 7 is a flowchart of another exemplary method 700 for handling the detection of an event onboard aircraft 10. Method 700 or part(s) thereof may be computer-implemented and may be performed using onboard apparatus 12 based on instructions stored in memory 26. Method 700 may be related to and performed in conjunction and cooperation with other methods described herein. Method 700 or part(s) thereof may be combined with part(s) of other methods disclosed herein. Accordingly, elaborations and variations provided in relation to other methods described herein may also apply to method 700 and will not be repeated.

In various embodiments, method 700 may comprise: detecting the event (see block 702); generating predefined additional information based on the event and storing the additional information in computer-readable medium 26 (see block 704); and upon receiving a request for the additional information from ground facility 18, automatically transmitting the additional information from aircraft 10 to ground facility 18 (see block 706). The transmission of the additional information may be automatically commanded by HMU 20 without requiring further external instructions from a pilot or other operator of aircraft 10. In some embodiments, the request may comprise query message 42 which may include the link associated with the additional information and the link may be used by HMU 20 to retrieve the additional information and command the transmission of response message 44 via terminal 22. Method 700 may also comprise the transmission of advisory message 40 to ground facility 18 after detection of the event and advisory message 40 may comprise identification of the event and a link to the additional information.

Figure 8:
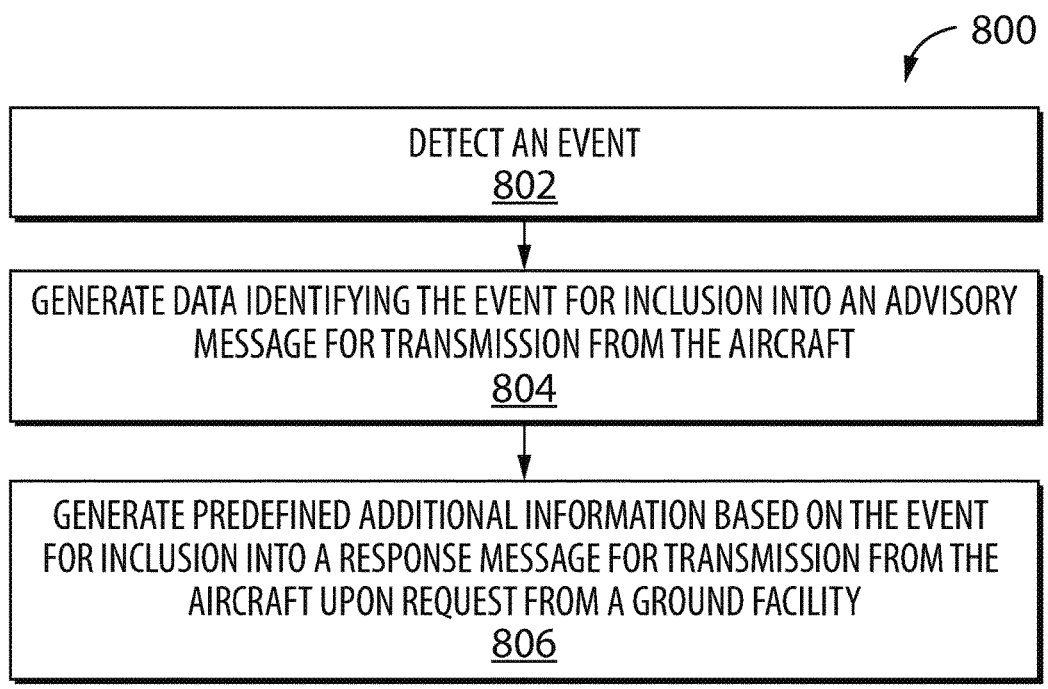
FIG. 8 is a flowchart of another exemplary method for handling the detection of an event onboard the aircraft of FIG. 1.

FIG. 8 is a flowchart of another exemplary method 800 for handling the detection of an event onboard aircraft 10. Method 800 or part(s) thereof may be computer-implemented and may be performed using onboard apparatus 12 based on instructions stored in memory 26. Method 800 may be related to and performed in conjunction and cooperation with other methods described herein. Method 800 or part(s) thereof may be combined with part(s) of other methods disclosed herein. Accordingly, elaborations and variations provided in relation to other methods described herein may also apply to method 800 and will not be repeated.

In various embodiments, method 800 may comprise: detecting the event (see block 802); generating data identifying the event for inclusion into advisory message 40 for transmission from aircraft 10 (see block 804); and generating predefined additional information based on the event for inclusion into response message 44 for transmission from aircraft 10 upon request from ground facility 18 (see block 806). The additional information may be stored in memory 26. Method 800 may also include generating a link to the additional information for inclusion into advisory message 40. Method 800 may also comprise automatically transmitting response message 44 upon receipt of the request. Again, the automatic transmission of response message 44 may be commanded by HMU 20 via terminal 22.

Figure 9A:
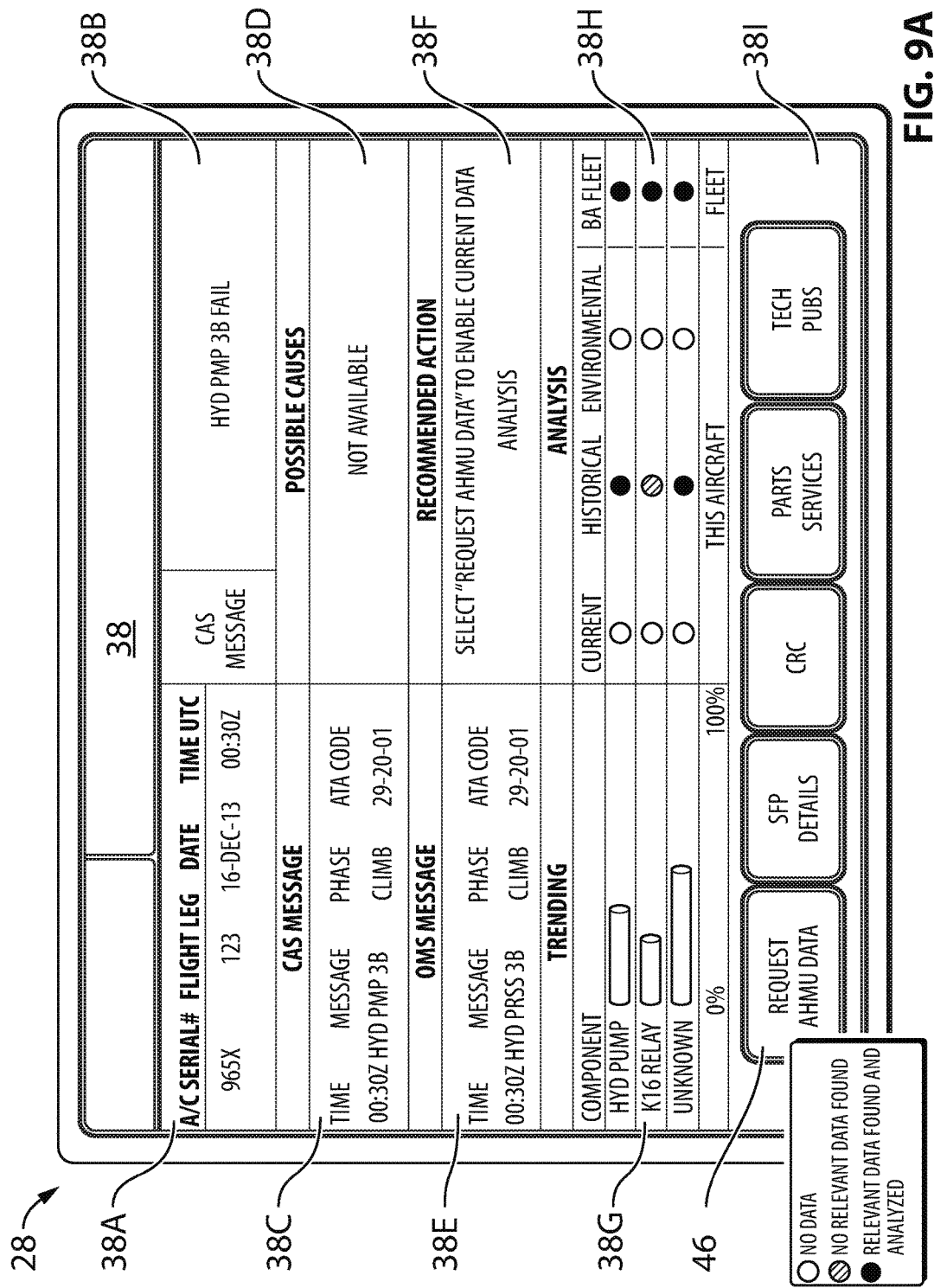
FIGS. 9A-9C show an exemplary embodiment of a ground-based apparatus of the ground facility of FIG. 2.
Figure 9B:
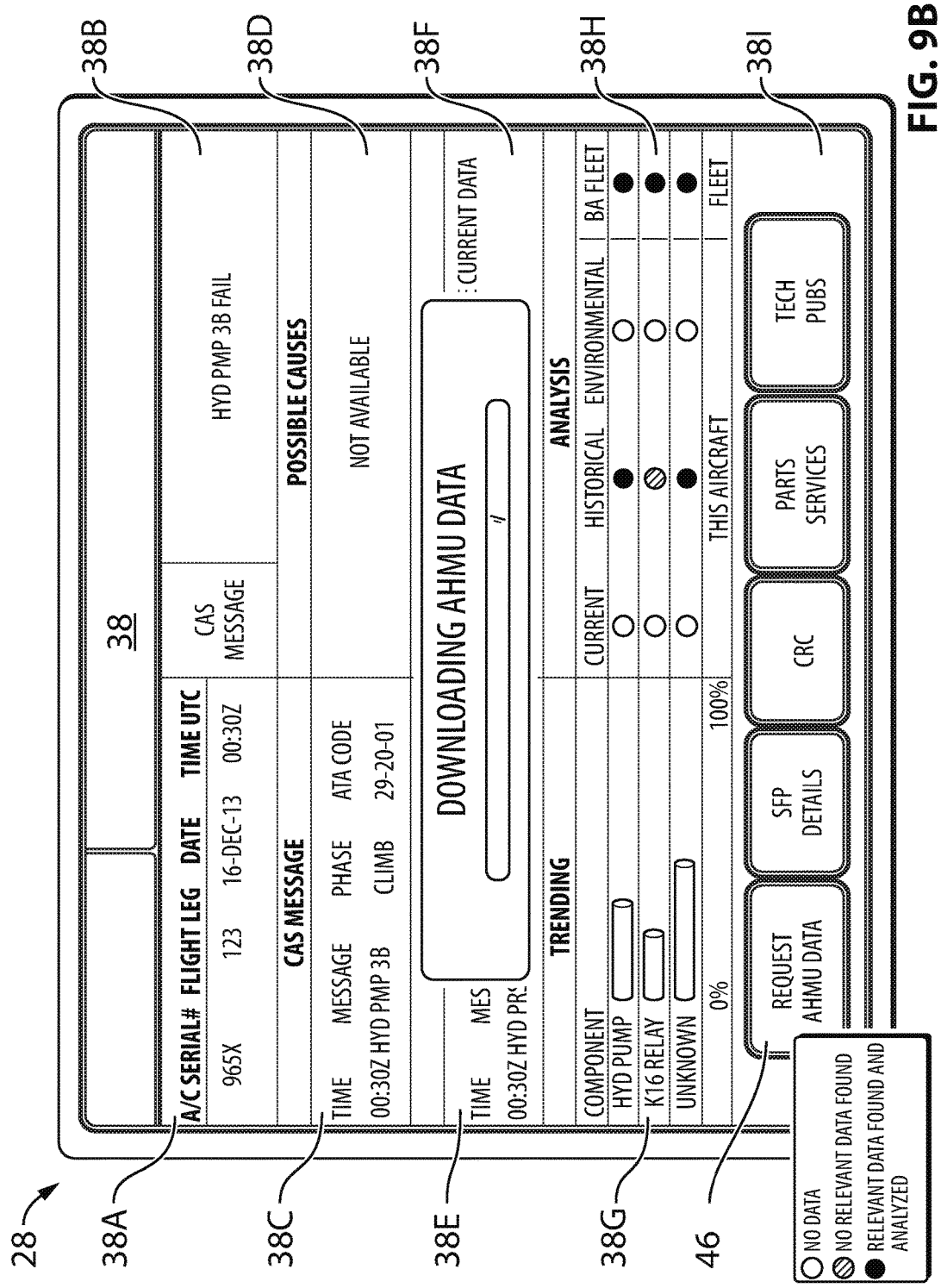
Figure 9C:
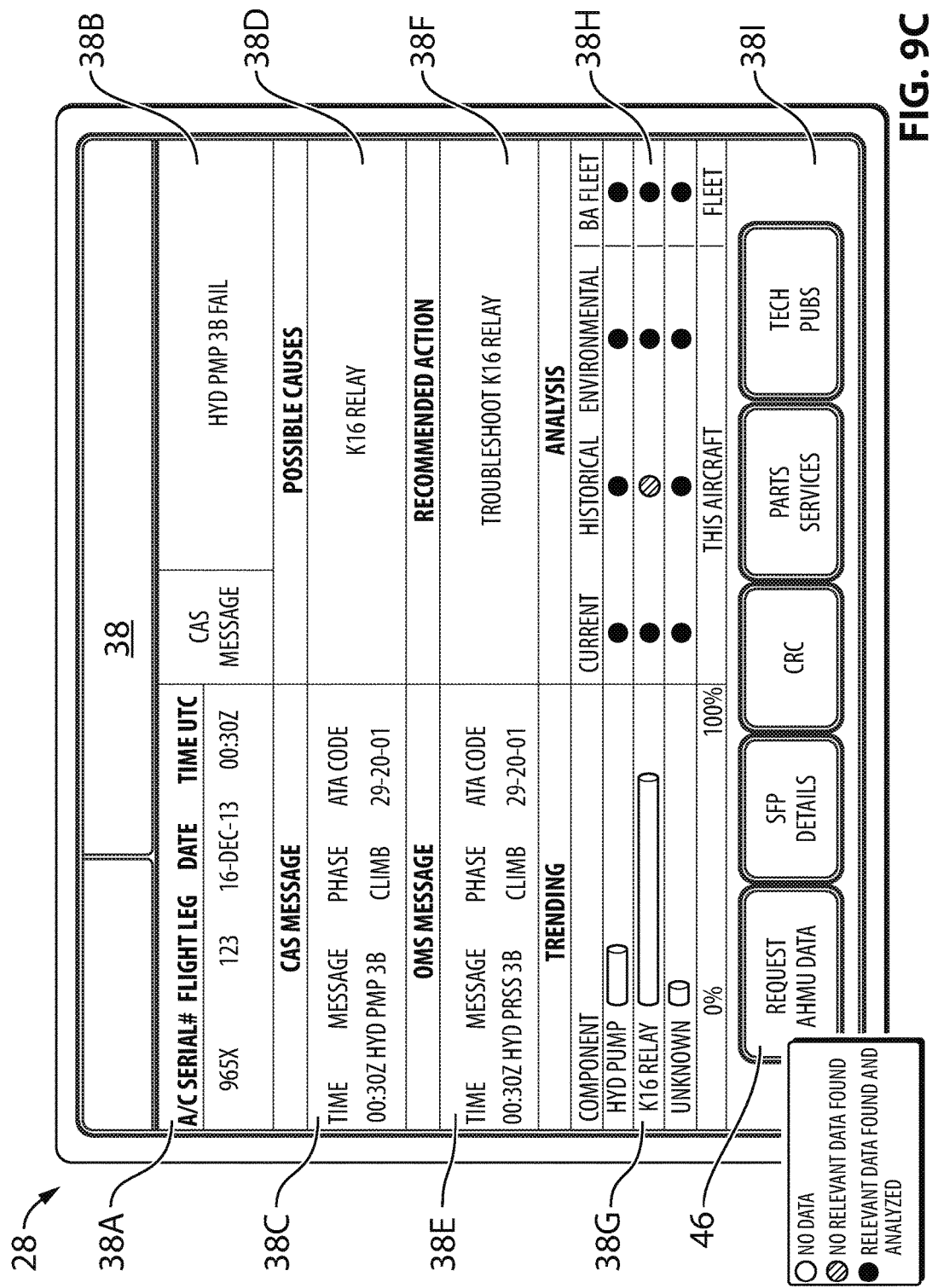

FIGS. 9A-9C shows an exemplary embodiment of ground-based apparatus 28. Ground-based apparatus 28 may comprise one or more general purpose computers, special purpose computers, or other programmable data processing apparatus. The exemplary embodiment of ground-based apparatus shown in FIG. 9C is a tablet computer that may comprise terminal 32, processor 34, memory 36 and display 38. Ground-based apparatus 28 may be configured for wired or wireless communication with one or more other data processing apparatus and data storage devices that may be part of ground-based apparatus 28 or ground facility 18 and that are not specifically shown in the figures.

Display 38 may comprise a touch-sensitive surface that permits user interaction with ground-based apparatus 28. Display 38 may be used to present a suitable GUI such as that shown in FIGS. 9A-9C. GUI may be designed to divide the area of display 38 into two or more regions 38A-38I. The different regions 38A-38I may have different functions such as displaying different categories of information and/or may comprise interactive objects or non-interactive (e.g., display-only) objects. For example, such objects may include cursors, buttons, icons, tabs, scroll bars, hyperlinks, radio buttons, check boxes, editable data fields, lists of selectable items, pull-down menus, display-only text and/or graphic fields and/or any other objects suitable for use in GUIs.

In the specific example shown in FIG. 9A, the data shown on display 38 may be derived from advisory message 40 that may have been received at ground-based apparatus 28 via ACARS. For example, region 38A of display 38 may show flight information such as an identification number (e.g., serial number, tail number) of aircraft 10, flight leg, date and time at which the event was detected. Region 38B may show a concise identification of the event such as a message generated by a crew alerting system (CAS) of aircraft 10. Region 38C may show a more detailed (e.g., comprehensive) identification of the event including the time at which the CAS message was generated, the phase of flight of aircraft 10, and an associate Air Transport Association (ATA) code associated with the event. Region 38D may show one or more potential causes of the detected event. Region 38E may show a message generated by an onboard maintenance system (OMS) of aircraft 10. The role of the OMS may be to capture maintenance data related to one or more of systems 16 and generate fault messages when appropriate. Region 38F may show one or more recommended actions to address the event by remedying or mitigating the potential cause(s) of the event. Region 38G may show a number of potential causes of the event with associated occurrence probabilities determined based on the data available. Region 38H may provide an indication of the type of data (e.g., current data, historical data, environmental data and/or fleet data) that has been used in identifying the potential causes listed in region 38G and/or used in computing the associated occurrence probabilities associated with the potential causes. Region 38I may comprise one or more interactive objects which the user may use to interact with ground-based apparatus 28. For example, region 38I may comprise button 46 which may be activated by a user to request the predefined additional information from aircraft 10. Region 38I may also comprise other buttons to access maintenance-related documentation or to plan maintenance-related activities.

The information shown in the different regions 38A-38H of display 38 of FIG. 9A may be based on advisory message 40, historical data and fleet data (e.g., reference levels). In the GUI shown in FIG. 9A, since the additional information has not yet been requested, the occurrence probabilities of the potential causes identified may not yet be refined to a level suitable to recommend a course of action to address the detected event at this point. For example, an "Unknown" potential cause may be listed together with the other known potential causes. If the probability associated to the "Unknown" cause is higher than the other known potential causes, then the recommended action shown in region 38F may be to request the additional information associated with the event and stored on aircraft 10. The request for the additional information may be initiated by the user by actuating button 46 in region 38I of display 38. For example, based on the nature of the event, the user may determine whether investigating the event can be deferred until aircraft 10 has landed or whether the event should be investigated immediately. In some embodiments, the request for the additional information could alternatively be initiated automatically without requiring user input. The initiation of the request for the additional information may comprise using the link obtained from advisory message 40 in order to generate query message 42 and commanding the transmission of query message 42 to aircraft 10 via ACARS.

The list of potential causes shown in 38G and their associated occurrence probabilities may be determined based on diagnostic (e.g., fault isolation) rules associated with the event. The diagnostic rules may be predefined based on the event and may be stored in memory 36 of ground-based apparatus 28. The diagnostic rules may comprise deductive event (e.g., failure) analysis rules including Boolean logic. In some embodiments, the diagnostic rules may be based on one or more predetermined fault trees associated with known potential events that may be detected and/or systems 16 of aircraft 10. In some embodiments, the diagnostic rules may include a look-up table identifying potential root causes for known potential events.

As shown in region 38G, the occurrence probabilities may be presented as numerical values such as a probability percentage being associated with each potential cause. The occurrence probabilities could instead or in addition be represented in the form of a bar graph. Other forms of presenting occurrence probabilities could also be used to provide an indication of likelihood of each potential cause. Examples of such indications could include colors such as red, yellow and green or descriptive words such as "LOW", "MEDIUM" and "HIGH".

The use of data from different sources may permit the occurrence probabilities to be refined to a level suitable for initiating recommended actions to address the event. Region 38H of display 38 shows in tabular format which type of data has been considered to determine the occurrence probabilities of the potential causes identified. In the example shown in FIGS. 9A-9C, a white circle in region 38H may indicate that the particular type of data was not considered in the determination of the occurrence probability, a gray circle may indicate that the particular type of data was considered but no relevant event data was found, a black circle may indicate that the particular type of data was considered and relevant data was found and considered. Accordingly, the GUI may provide an indication of potential causes for the event detected with associated occurrence probabilities and also an indication of refinement of the occurrence probabilities computed. The level of refinement may also provide an indication of reliability in the identified potential cause(s) and the recommended action(s). Therefore depending on whether the potential causes identified and the corresponding occurrence probabilities are satisfactory to a user based only on advisory message 40 (and optionally historical data and/or fleet data), a user may decide whether or not the additional information stored on aircraft 10 should be requested.

As explained above, the additional information that is transmitted in response message 44 may comprise current data and/or environmental data. In addition to using current and environmental data, the identification of potential causes and also the computation of occurrence probabilities may be conducted using historical data and/or fleet data. Historical data may comprise similar event data and trends from the specific (target) aircraft 10. For example, historical data may relate to a previous occurrence of the same or a related event on the same aircraft 10. Historical data may also relate to a previous occurrence of another event associated with the same or other system 16 of the same aircraft 10. Fleet data may comprise event and/or parametric data associated with one or more other comparable aircraft. For example, fleet data may relate to a previous occurrence of the same event on one or more other aircraft. Fleet data may also relate to a previous occurrence of another event associated with the same or other system 16 of one or more other aircraft.

With respect to current data, the data may be analyzed using an algorithm and a weighted probability value may be assigned, if applicable, to a potential cause. With respect to historical data, this data may be stored in memory 36 and the analysis using this data may be done without requiring the additional information from aircraft 10. The historical data may be analyzed for past faults and parameters that are trending to the event. A weighted solution may be used to determine if a potential cause can be determined based on the event history or data trends associated with aircraft 10. With respect to environmental data, the analysis may be conducted based on a model of the specific system 16 where the flight conditions and the environmental conditions are analyzed and the output is weighted and added to the results. With respect to fleet data, this data may be stored in a fleet database in memory 36 and the analysis using this data may be done without requiring the additional information from aircraft 10. The fleet data may be analyzed for similar events, associated parametric data and for trends or potential causes.

FIG. 9B shows an exemplary representation of the GUI of FIG. 9A after the user has requested the additional information by actuating button 46. FIG. 9B shows a progress bar indicating the downloading of the additional information (HMU Data).

FIG. 9C shows another exemplary representation of the GUI of FIG. 9A after the additional information has been received at ground-based apparatus 28 and analysed. FIG. 9C shows that current data, historical data, environmental data and fleet data have been considered and that relevant data has been found. With respect to the "K16 Relay" potential cause, historical data is indicated as having been considered but that no data relevant to this specific potential cause was found. Nevertheless, the occurrence probabilities shown in FIG. 9C have been refined so that the probability of "K16 Relay" potential cause is shown as being relatively high and the "Unknown" potential cause is shown as being relatively low. In view of the refined occurrence probabilities, the possible cause has been identified as "K16 Relay" in region 38D and the recommended action has been identified as "Troubleshoot K16 Relay" in region 38F of display 38.

Ground-based apparatus 28 may permit the investigation into an event to begin even when aircraft 10 is still in flight and hence remotely from aircraft 10. The investigation may also be conducted substantially immediately after the event has been detected. Based on the recommended action(s) that is/are output by ground-based apparatus 28, required maintenance-related activities associated with the recommended action(s) may also be initiated even though aircraft 10 may still be in flight. For example, a replacement "K16 Relay" could be ordered and delivered to the location where aircraft 10 is next scheduled to land. Also, required maintenance personnel may be notified and instructed to schedule and perform the replacement of the "K16 Relay" when aircraft 10 lands. Accordingly, maintenance personnel may carry out preparatory maintenance-related activities before physically getting access to the aircraft and in some cases even before the aircraft has landed. For example, maintenance personnel may make preparations including staffing, obtaining the necessary tools and replacement parts and/or reviewing the necessary maintenance procedures so that the replacement of "K16 Relay" may be performed relatively efficiently once aircraft 10 has landed and so that aircraft 10 may return to service relatively quickly (i.e., reduced turnaround time). In some cases the identification of a recommended action using ground-based apparatus 28 may reduce or substantially eliminate the troubleshooting time with aircraft 10 out of service that would otherwise be required. In some cases, the identification of such recommended action may also reduce or eliminate the need for re-powering aircraft 10 or systems 16 thereof to investigate the event by using data that was collected at the time of the event. In some cases, the identification of such recommended action may also reduce or eliminate the need to re-create the event in order to investigate the event. In some cases, the need for keeping a large number of parts in inventory at various locations may also be reduced.

In some cases, the investigation into an event using ground-apparatus 28 may also permit the identification of a potential cause with some degree of certainty (e.g., relatively high occurrence probability) and such identification may be communicated back to the pilot(s). The knowledge of such potential cause for the event may assist the pilot(s) in continuing to operate the aircraft and, if necessary, safely land aircraft 10.

Figure 10:
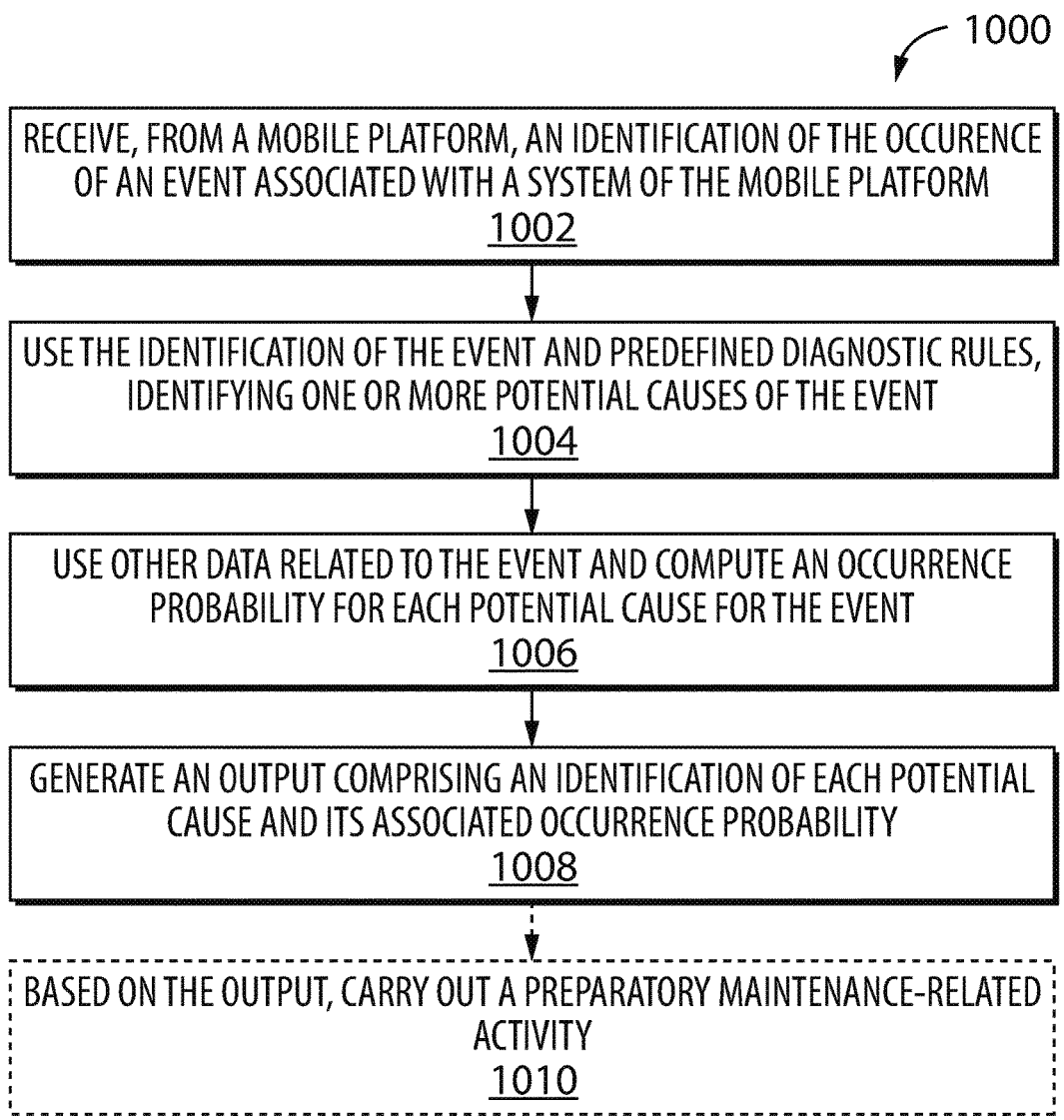
FIG. 10 is a flow chart of an exemplary method for determining the probability of a cause of an event detected onboard a mobile platform.

FIG. 10 is a flow chart of an exemplary method 1000 for determining the probability of a cause of an event detected onboard a mobile platform. Method 1000 or part(s) thereof may be computer-implemented and may be performed using ground-based apparatus 28 based on instructions stored in memory 36. Alternatively, part(s) of method 1000 may be performed using onboard apparatus 12 based on instructions stored in memory 26. Method 1000 may be related to and performed in conjunction and cooperation with other methods described herein. Method 1000 or part(s) thereof may be combined with part(s) of other methods disclosed herein. Accordingly, elaborations and variations provided in relation to other methods described herein may also apply to method 1000 and will not be repeated.

In various embodiments, method 1000 may comprise: receiving, from the mobile platform (e.g., aircraft 10), an identification of the event associated with system 16 of the mobile platform (see block 1002); using the identification of the event and predefined diagnostic rules associated with the event, identifying one or more potential causes of the event (see block 1004); and using other data (e.g., reference levels) related to the event, computing an occurrence probability for each potential cause for the event (see block 1006); and generating an output (e.g., signals representative of GUI shown on display 38), the output comprising an identification of each potential cause and its associated occurrence probability (see region 38G in FIG. 9C and block 1008 in FIG. 10).

In various embodiments, the pre-defined diagnostic rules associated with the event may be retrieved from computer-readable medium 36 coupled to processor 34.

In various embodiments, generating the output may occur while the mobile platform is in transit (e.g., flight). The other data may comprise one or more of current data, historical data, environmental data and fleet data as described above. The output may also comprise an indication of the type(s) of other data used to compute the occurrence probability of each potential cause (see region 38H of FIG. 9C.

In some embodiments, the output of method 1000 may comprise an indication of one or more potential causes that may each have a relatively high occurrence probability. Accordingly, method 1000 may optionally further comprise maintenance personnel carrying out, based on this output, preparatory maintenance-related activities before physically getting access to the aircraft and in some cases even before the aircraft has landed (see block 1010). For example, the preparatory maintenance-related activities may be related to the one or more potential causes having the highest occurrence probabilities.

In various embodiments, aspects of the present disclosure including instructions for carrying out the various methods disclosed herein may be embodied as computer program products. For example, a computer program product for assisting with maintenance of a mobile platform with a ground-based apparatus may comprise a non-transitory computer readable storage medium 36 having program code embodied therewith. The program code may be readable/executable by processor 34 or other logic circuit to perform one or more methods disclosed herein. For example, such method may comprise: using data including an identification of the event received from the mobile platform and pre-defined diagnostic rules stored in computer-readable medium 36, identifying one or more potential causes of the event; using other data related to the event, computing an occurrence probability for each potential cause for the event: and generating an output (i.e., signals) for display device 38, the output comprising an identification of each potential cause and its associated occurrence probability.

FIG. 11 is a table illustrating exemplary additional information associated with a hydraulic system failure that may be generated and stored on aircraft 10 when an event (e.g., HYD_PUMP_3B_FAIL) is detected. However, depending on the nature of the detected event, the additional information would be associated with the one or more systems of aircraft 10 which are believed to be associated to the event. As described above, the additional information may comprise current data including values of one or more sensed parameters and environmental data and may be used to determine potential causes for the detected event and compute associated occurrence probabilities. For example, the current data may comprise sensed pressures, temperatures, voltages, currents and/or other parameters or status indication(s) associated with the hydraulic or other related system(s) and associated date/time values at which the sensed parameters were measured. The additional information may also include environment data such as, for example, ambient temperature, outside air temperature (OAT), altitude, airspeed, pitch rate, roll rate, yaw rate and heading. Such additional information may be transmitted via response message 44 and used to determine potential causes for the detected event and compute associated occurrence probabilities.

FIG. 12 is a table illustrating exemplary historical data that may be used to determine potential causes for the detected event and compute associated occurrence probabilities. Historical data may comprise similar event data and trends from the specific (target) aircraft 10. For example, historical data may relate to a previous occurrence of the same event (e.g., HYD_PUMP_3B_FAIL) and/or a related event on the same aircraft 10. Accordingly, the historical data may comprise information about one or more occurrences of the same or other related event(s) and may include a description of an event, a date/time associated with the occurrence of the event, an indication of the system(s) affected by the event and one or more root cause(s) identified for the detected event. The historical data may also comprise relevant current/environment data associated with the event and that may be used for comparison with the additional information obtained from aircraft 10 for the purpose of refining occurrence probabilities.

FIG. 13 is a table illustrating exemplary fleet data that may be used to determine potential causes for the detected event (e.g., HYD_PUMP_3B_FAIL) and compute associated occurrence probabilities. Fleet data may comprise similar event data and trends associated with one or more other comparable aircraft. For example, fleet data may relate to a previous occurrence of the same event on one or more other aircraft. Fleet data may also relate to a previous occurrence of another event associated with the same or other system 16 of one or more other aircraft. Accordingly, the fleet data may comprise information about one or more occurrences of the same or other related event(s) on the same or other related aircraft that may be considered of the same family or fleet and/or have sufficient commonality that an event occurrence on the related aircraft may be helpful in troubleshooting an event on the target aircraft. The fleet data may include a description of an event, a date/time associated with the occurrence of the event, an indication of the system(s) affected by the event, one or more root cause(s) identified for the detected event and some form of identification (e.g., tail number) of the related aircraft. The fleet data may also comprise relevant current/environment data associated with the event and that may be used for comparison with the additional information obtained from aircraft 10 for the purpose of refining occurrence probabilities.

Figure 14:
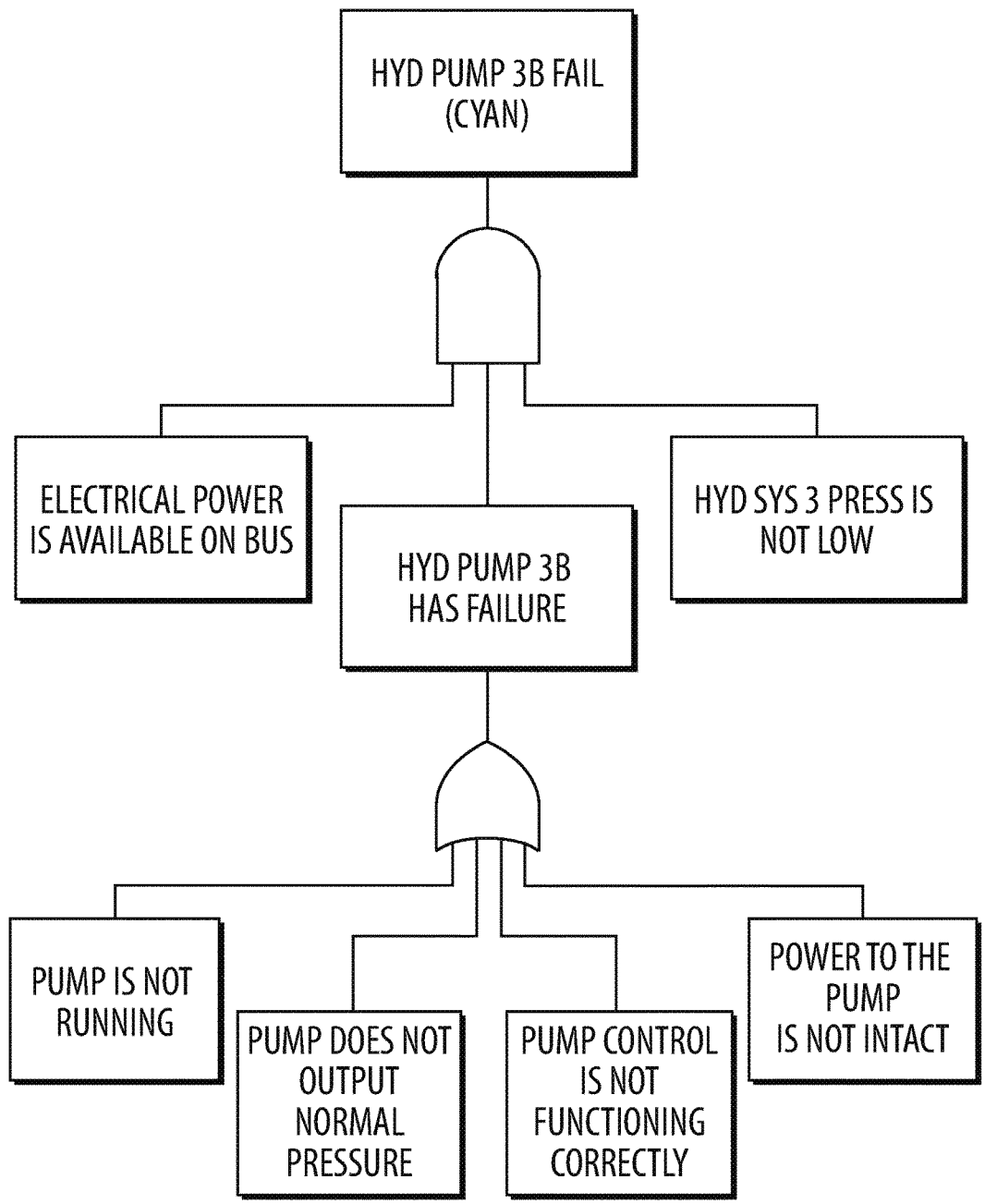
FIG. 14 shows an exemplary fault tree.

FIG. 14 shows an exemplary fault tree which may be used to determine potential causes for the detected event. The diagnostic rules used to determine the potential causes may be based on one or more fault trees such as that shown in FIG. 14. In some embodiments, such diagnostic rules may be used initially to identify potential causes for the detected event before refining the occurrence probabilities for the potential causes. Alternatively, the diagnostic rules may simply comprise a database including potential causes associated with given events that could be detected. Accordingly, in some embodiments, the diagnostic rules could be in the form of a look-up table used to identify pre-determined potential causes for one or more events.

Examples 1 and 2 described below illustrate how numerical values for occurrence probabilities of an exemplary event (i.e., HYD_PUMP_3B_FAIL) may be computed and also refined using the different types of data (e.g., historical, fleet, current and environmental data) disclosed in the present application. Examples 1 and 2 are not exhaustive and there are other ways in which the different types of data disclosed herein and also other types of data could be used to obtain occurrence probabilities. Such other ways are intended to be included within the spirit and scope of the present disclosure. The occurrence probabilities computed in the examples below may be intended to be displayed in region 38G of display 38 shown in FIGS. 9A-9C, however, it should be noted that the occurrence probabilities displayed in region 38G of FIGS. 9A-9C do not necessarily correspond to the numerical values computed in Examples 1 and 2 below.

EXAMPLE 1

The explanation below illustrates how, based on the information shown in FIGS. 11-14, potential causes may be determined for an exemplary event (e.g., HYD_PUMP_3B_FAIL) detected onboard aircraft 10 and how associated occurrence probabilities (e.g., percentage values) may be computed for the potential causes. Potential causes of this exemplary event may be identified based on diagnostic rules in the form of a database (e.g., look-up table) stored in memory 36. For example, the database may store a list of potential causes associated with the detected event and other events. In this example, based on a look-up operation within such a database, it is determined that there may be three potential causes for this event, which may be a malfunction of the hydraulic pump, a malfunction of the K16 relay or other causes associated with other systems. For the purpose of this example only, the other causes are grouped together and referenced as "unknown".

As explained above, the diagnostic rules could alternatively or in addition comprise fault tree logic such as that shown in FIG. 14. Such fault tree could be used to identify basic events (e.g., "pump is not running", pump does not output normal pressure", "pump control is not functioning correctly" and "power to the pump is not intact") that may have led to the detected event of "HYD_PUMP_3B_FAIL". For the purpose of the present example, the identified potential causes associated with the basic events identified from the fault tree could be the same as those identified above. The potential causes may be identified from diagnostic rules comprising a fault tree that takes into consideration other information available, such as the historical data, fleet data, current data, environmental data and/or other sources of data in order to navigate the fault tree logic. In some embodiments, fault tree logic may be used in conjunction with one or more look-up tables where the fault tree could be used to identify the basic events and the look-up table could be used to identify the potential causes associated with those basic event. Alternatively, the fault tree logic (e.g., FIG. 14) could lead directly to potential causes. In the absence of any other source of data (i.e., without refinement), the three potential causes could be given equal occurrence probabilities of 33% each.

Occurrence probabilities for each of the identified potential causes may be computed/refined by taking into consideration the information shown in FIGS. 11-14. Firstly, if only historical data is available for computing occurrence probabilities for the potential causes, a calculation can be performed of the historical percentage occurrence of each of the potential causes. For example, based on the historical data alone, it may be determined that for the detected event "HYD_PUMP_3B_FAIL", the root cause has been associated with the K16 relay six out of nine occurrences (i.e., 67% of the time), a pump failure one out of nine occurrences (i.e., 11% of the time) and some other (unknown) causes relating to systems other than the hydraulic system two out of nine occurrences (i.e. 22% of the time). Therefore, if only historical data is available, these could be the occurrence probabilities assigned to each of the potential causes.

Now if both historical data and fleet data are available as shown in FIG. 9A, the fleet data could be considered in a similar manner as the historical data and then the fleet data and the historical data could be given respective weightings in order to combine the results from the two sources of data and obtain more refined occurrence probabilities for the potential causes. For example, based on the fleet data alone, it may be determined that for the detected event "HYD_PUMP_3B_FAIL", the root cause has been associated with the K16 relay 15 out of 18 occurrences (i.e., 83% of the time), a pump failure one out of 18 occurrences (i.e., 6% of the time) and some other (unknown) causes relating to systems other than the hydraulic system two out of 18 occurrences (i.e. 11% of the time). The historical data may, for example, be given a weighting of 30% and the fleet data may be given a weighting of 70%. These weightings may be pre-defined and stored in the memory 36, or they may be determined based on an algorithm available to the data processor 34. For example, the weightings may change based on the amount of data available in the historical data vs. the amount of data available in the fleet data. If there is very little historical data available and far more fleet data available, it is possible that the fleet data may have a greater weighting than the historical data. Accordingly, the weightings may be fixed and pre-defined or may be dynamic based on the contents of the data available.

The occurrence probabilities of each potential cause using both the historical data and the fleet data may be computed based on known or other methods. For example, the combined occurrence probabilities for each potential cause may be a weighted average using normalized weighting values (between 0 and 1) by using equation 1 below. Table 1 below shows the combined occurrence probabilities computed based on historical data and fleet data. The values for the combined occurrence probabilities may be represented in the form of a bar graph in region 38G of FIG. 9A.

Combined Occ. Prob.=Occ. Prob. 1 (weighting 1)+Occ. Prob. 2 (weighting 2)+[ . . . ]Occ. Prob. *n* (weighting *n*)         Equation 1:

TABLE 1

Combined occurrence probabilities of potential causes computed based on historical data and fleet data.

| Potential | Historical Data | | Fleet Data | | Combined |
| --- | --- | --- | --- | --- | --- |
| Causes | Occ. Prob. % | Weighting | Occ. Prob. % | Weighting | Occ. Prob. % |
| K16 Relay | 67 | 0.3 | 83 | 0.7 | 78 |
| Hydraulic Pump | 11 | 0.3 | 6 | 0.7 | 8 |
| Unknown | 22 | 0.3 | 11 | 0.7 | 14 |

The additional current and environmental data may be obtained and used to refine the above probabilities. For example, the current and environmental data may be used to refine the weightings assigned to the historical and fleet data, or may be used to define the subset of historical or fleet data to use to arrive at the occurrence probabilities. In some embodiments, the current and environmental data may also be used to conduct fault tree analysis to identify and adjust the potential causes associated with the detected event.

As explained above, when a particular event is detected, predefined additional information relating to that event may be automatically generated and stored onboard the aircraft and transmitted to ground-based apparatus 28 upon request. Some or all of the predefined additional information may be current and/or environmental data associated with or experienced by the aircraft at or around the time of the detected event. Therefore, the historical data shown in FIG. 12, and the fleet data shown in FIG. 13, may also comprise relevant current and/or environmental data associated with each stored event.

With respect to the present example, the pre-defined additional information (e.g., current and/or environmental data) associated with the particular event "HYD_PUMP_3B_FAIL" may be used to further refine the occurrence probabilities computed above for each of the identified potential causes. This determination may be done at least partially based on the values of the occurrence probabilities computed so far. For example, if the highest occurrence probability is associated with the "unknown" potential cause then it may be determined that further refinement is needed and that the additional information should be brought into the analysis. Alternatively, if the highest occurrence probability is associated with the K16 relay and has a value of 78%, such value may be satisfactory to permit maintenance personnel to begin preparations for troubleshooting and potentially replacing the K16 relay.

For the purpose of the present example, the additional information received from the aircraft may be used to adjust weightings applied to each of the historical and fleet data. Alternatively, the additional information may be used to select a more relevant subset of historical data and/or fleet data to be used in the analysis. For example the current/environment data in the historical data and fleet data may be compared to the additional information received from the aircraft so that only the most relevant records (e.g., under similar environmental and/or current conditions) may be used in the refinement of the occurrence probabilities.

Accordingly, the current and environmental data received from the aircraft and associated with the detected event may be used to refine the weightings used to refine the occurrence probabilities. For example, when the current and environmental data is received, it may be determined based on the fleet data (such as that shown in FIG. 13) that for the same current and environmental conditions detected, it is always the same root cause (such as the K16 relay) that caused that detected condition. In such a case, a greater weighting may be given to the fleet data, since the fleet data shows that for the given current and/or environmental data detected, there is a high statistical likelihood that the fleet data will lead to the most likely root cause. Therefore, the weighting given to the fleet data may be upgraded from 70% to 90%, such that the occurrence probabilities will then be calculated using Equation 1 using the revised weightings. The values for the combined occurrence probabilities may be represented in the form of a bar graph in region 38G of FIG. 9C.

TABLE 2

Combined occurrence probabilities of potential causes computed based on historical data and fleet data using weightings revised based on current and environmental data.

| Potential | Historical Data | | Fleet Data | | Combined |
| --- | --- | --- | --- | --- | --- |
| Causes | Occ. Prob. % | Weighting | Occ. Prob. % | Weighting | Occ. Prob. % |
| K16 Relay | 67 | 0.1 | 83 | 0.9 | 81 |
| Hydraulic Pump | 11 | 0.1 | 6 | 0.9 | 7 |
| Unknown | 22 | 0.1 | 11 | 0.9 | 12 |

EXAMPLE 2

In accordance with a second example, the current and environmental data associated with the detected event may be used in order to define a more relevant subset of historical or fleet data to be used to arrive at the occurrence probabilities for each of the potential causes. For example, when the current and environmental data is received, it may be determined based on one or both of the fleet data (FIG. 13) and historical data (FIG. 12) that under the same current and environmental conditions, it is always the same root cause e.g., the K16 relay. For the sake of this example, the data taken from the fleet data may be limited to only include the root causes for the same event and which occurred during the same or comparable current and environmental conditions. In such a case, the fleet data may show that for the same current and environmental conditions, the root cause for the detected event "HYD_PUMP_3B_FAIL", is: the hydraulic pump 0% of the time, the K16 relay 100% of the time and other/unknown causes 0% of the time. Therefore, when this refined subset of data is applied to Equation 1 above using the initial normalized weightings of EXAMPLE 1 (i.e., 0.3 for historical data and 0.7 for fleet data), the refined occurrence probabilities may be those shown in Table 3 below. A similar subset of the historical data could also be selected based on the current and environmental data obtained from the aircraft. The values for the combined occurrence probabilities may be represented in the form of a bar graph in region 38G of FIG. 9C.

TABLE 3

Combined occurrence probabilities of potential causes computed based on the historical data and only a subset of the fleet data selected based on current and environmental data.

| Potential Causes | Historical Data | | Fleet Data | | Combined |
|---|---|---|---|---|---|
| | Occ. Prob. % | Weighting | Occ. Prob. % | Weighting | Occ. Prob. % |
| K16 Relay | 67 | 0.3 | 100 | 0.7 | 90 |
| Hydraulic Pump | 11 | 0.3 | 0 | 0.7 | 3 |
| Unknown | 22 | 0.3 | 0 | 0.7 | 7 |

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, one skilled in the relevant arts will appreciate that while the systems, devices, apparatus and methods disclosed and shown herein may comprise a specific number of elements/components, the systems, devices apparatus and methods could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A computer-implemented method for assisting in the maintenance of a mobile platform by determining occurrence probabilities of one or more potential causes of an event detected onboard the mobile platform, the method performed by a ground-based apparatus remote from the mobile platform, the method comprising:
   receiving, at the ground-based apparatus and from the mobile platform, an identification of the event associated with a system of the mobile platform;
   using the identification of the event and predefined diagnostic rules associated with the event, identifying the one or more potential causes of the event;
   using other data related to the event, computing an occurrence probability for each potential cause for the event; and
   generating an output, the output comprising an identification of each potential cause and the occurrence probability of each potential cause.

2. The method as defined in claim 1, wherein the other data comprises current data received from the mobile platform, the current data including a sensed parameter or a derived parameter associated with the system.

3. The method as defined in claim 1, wherein generating the output occurs while the mobile platform is in flight.

4. The method as defined in claim 1, wherein the other data comprises historical data.

5. The method as defined in claim 4, wherein the historical data relates to a previous occurrence of the same event on the same mobile platform.

6. The method as defined in claim 4, wherein the historical data relates to a previous occurrence of another event on the same mobile platform.

7. The method as defined in claim 1, wherein the other data comprises fleet data.

8. The method as defined in claim 7, wherein the fleet data relates to a previous occurrence of the same event on another mobile platform.

9. The method as defined in claim 7, wherein the fleet data relates to a previous occurrence of another event on another mobile platform.

10. The method as defined in claim 1, wherein the other data comprises environmental data.

11. The method as defined in claim 10, wherein the environmental data comprises any one of weather data, flight environment data and mobile platform performance data.

12. The method as defined in claim 1, wherein generating the output comprises displaying an identification of each cause with a corresponding indication of its associated probability on a graphical user interface.

13. The method as defined in claim 1, wherein the occurrence probability includes a percentage.

14. The method as defined in claim 1, wherein the occurrence probability includes an indication of relative likelihood of occurrence of each potential cause.

15. The method as defined in claim 1, wherein the output comprises an indication of one or more types of other data used to compute the occurrence probability of each potential cause.

16. A ground-based apparatus for assisting with maintenance of a mobile platform, the apparatus being remote from the mobile platform and comprising:
- a communication terminal for receiving data from the mobile platform;
- a display device;
- a data processor coupled to the communication terminal and to the display device; and
- a non-transitory computer-readable medium containing instructions readable and executable by the data processor to perform a method comprising:
  - using data including identification of the event received from the mobile platform and predefined diagnostic rules stored in the computer-readable medium, identifying one or more potential causes of the event;
  - using other data related to the event, computing an occurrence probability for each potential cause for the event; and
  - generating an output for the display device, the output comprising an identification of each potential cause and the occurrence probability of each potential cause.

17. The apparatus as defined in claim 16, wherein the other data comprises current data from the mobile platform, the current data including a sensed parameter or a derived parameter associated with the system.

18. The apparatus as defined in claim 16, wherein the other data comprises historical data.

19. The apparatus as defined in claim 18, wherein the historical data relates to a previous occurrence of the same event on the same mobile platform.

20. The apparatus as defined in claim 18, wherein the historical data relates to a previous occurrence of another event on the same mobile platform.

21. The apparatus as defined in claim 16, wherein the other data comprises fleet data.

22. The apparatus as defined in claim 21, wherein the fleet data relates to a previous occurrence of the same event on another mobile platform.

23. The apparatus as defined in claim 21, wherein the fleet data relates to a previous occurrence of another event on another mobile platform.

24. The apparatus as defined in claim 16, wherein the other data comprises environmental data.

25. The apparatus as defined in claim 24, wherein the environmental data comprises any one of weather data, flight environment data and mobile platform performance data.

26. The apparatus as defined in claim 16, wherein generating the output comprises causing the display device to display an identification of each cause with a corresponding indication of its associated probability.

27. The apparatus as defined in claim 16, wherein the occurrence probability includes a percentage.

28. The apparatus as defined in claim 16, wherein the occurrence probability includes a relative indication of likelihood of each potential cause.

29. The apparatus as defined in claim 16, wherein the output comprises an indication of one or more types of other data used to compute the probability of occurrence of each potential cause.

30. A computer program product for assisting with maintenance of a mobile platform with a ground-based apparatus remote from the mobile platform, the computer program product comprising a non-transitory computer readable storage medium having program code embodied therewith, the program code readable/executable by a computer, processor or logic circuit to perform a method comprising:
- using data including an identification of the event received at the ground-based apparatus from the mobile platform and predefined diagnostic rules stored in the computer-readable medium, identifying one or more potential causes of the event;
- using other data related to the event and the predefined diagnostic rules, computing an occurrence probability for each potential cause for the event; and
- generating an output for a display device, the output comprising an identification of each potential cause and the occurrence probability of each potential cause.

31. The computer program product as defined in claim 30, wherein the other data comprises one or more of current data, historical data, environmental data and fleet data.

32. The computer program product as defined in claim 31, wherein the output comprises an indication of one or more types of other data used to compute the probability of occurrence of each potential cause.

* * * * *